United States Patent [19]
Forrest et al.

[11] Patent Number: 6,049,781
[45] Date of Patent: Apr. 11, 2000

[54] RELOCATION TRACKING SYSTEM AND METHOD

[75] Inventors: Pamela Jean Forrest, The Colony; Michael J. Campbell, Plano; Todd J. Fullerton, Flower Mound; Michael J. Celentano, Allen; Richard K. Brewer, Plano, all of Tex.

[73] Assignee: Electronic Data Systems Corporation, Plano, Tex.

[21] Appl. No.: 08/634,479

[22] Filed: Apr. 18, 1996

[51] Int. Cl.[7] .................................................. G06F 17/60
[52] U.S. Cl. .................................. 705/30; 705/38; 705/44
[58] Field of Search ..................................... 235/379, 380, 235/381; 705/28, 30, 32, 34, 14, 40, 11

[56] References Cited

U.S. PATENT DOCUMENTS

| | | | |
|---|---|---|---|
| 4,700,297 | 10/1987 | Hagel | 364/408 |
| 4,953,085 | 8/1990 | Atkins | 364/408 |
| 5,182,705 | 1/1993 | Barr | 364/401 |
| 5,600,554 | 2/1997 | Williams | 395/201 |
| 5,636,117 | 6/1997 | Rothstein | 395/204 |
| 5,644,727 | 7/1997 | Atkins | 395/240 |
| 5,680,305 | 10/1997 | Apgar | 364/401 |

OTHER PUBLICATIONS

Mandel, Mel, Software fights Corporate Form Flood, ComputerWorld, V25 is 24 p 114, Jun. 1992.

Chamness, Robert, Just When you Thought it was safe to get back in the water, ABA Bank Compliance, vol. 17, Is: 9, p25–28, Sep. 1996.

Kider, Mitchel, Another December Surprise, Mortage Banking, V 53, Is 3, pp. 38–45, Dec. 1992.

ABA BAnk Compliance, The Agencies, V 14, Is 6, p7–8, Abstract, Jun. 1993.

Chamness, Robert, What Changed the face of the mortage lending industry overnight, V 14, Is 4, p13–27, Apr. 1993.

Moore, Cassandra Chromes, Regulatory Chokehold: Good news for the Home Buyer—At Long Last, Wall Street Journal, Sec. A p 14, Jan. 7, 1993.

Networking Management, Employee Relocation firm uses software to improve data operations, pp 72–73, Apr. 1990.

*Primary Examiner*—Allen R. MacDonald
*Assistant Examiner*—Hani M. Kazimi
*Attorney, Agent, or Firm*—L. Joy Griebenow; Baker & Botts L.L.P.

[57] ABSTRACT

A relocation tracking system (10) and method are provided. The relocation tracking system (10) includes a mass storage device for storing a relocation database (22) and a processor (40). Relocation database (22) includes a transferee table (44) and a shipping table (48). Relocation database (22) may include any of a variety of other tables such as an expense table (46), a shipping table (48), a home selling table (50), a home buying table (52), a tracking table (54), a non-relocation table (56), and a comment table (58). The processor (40) processes a relocation request that indicates the authorized benefits for each relocation. The processor (40) accesses and updates the transferee table (44) and the shipping table (48) of relocation database (22) in response to processing the relocation request.

33 Claims, 12 Drawing Sheets

RELOCATION TRACKING SYSTEM AND METHOD

TECHNICAL FIELD OF THE INVENTION

This invention relates generally to the field of information processing and more particularly to a relocation tracking system and method for tracking a relocation.

BACKGROUND OF THE INVENTION

Companies frequently relocate employees from one location to another. Relocations occur for various reasons. For example, newly hired employees living outside a work location must be relocated to the work location. Similarly, existing employees may transfer from one work location to another or, as new work locations are established, existing employees may be transferred to a new work location. Relocations are especially prevalent in the service industries where teams of employees may be called upon to transfer from one work location to another when a new project is started.

The relocation process is a long, tedious, and expensive process that normally occurs over many months and sometimes even years. The relocation process involves the coordination of many different relocation events. For example, a relocation may involve such events as shipping, home selling, lease breakage, house shopping, home buying, and mortgage assistance. Each of these relocation events involves considerable coordination and paperwork.

To further complicate relocations, not all employees are entitled to the same relocation benefits. For example, a senior manager involved in a relocation will generally be authorized to receive more comprehensive relocation benefits as compared to an entry level employee. All of the relocation events and authorized benefits must be carefully tracked throughout the relocation. The relocation events must also be coordinated with accounting and payroll personnel to insure that vendors and employees are properly paid and reimbursed.

Because of the complexity and expense of relocations, large corporations, especially those that routinely relocate personnel, often have separate relocation departments with significant staffs to handle relocation coordination. Each relocation is normally assigned to a relocation coordinator from the relocation department for coordination throughout the relocation. The relocation coordinator is in contact with the relocating employee ("transferee") and the various outside vendors and service providers, such as shipping companies and real estate agents, involved in the relocation.

The relocation process is primarily a manual process with paper records and files maintained throughout the relocation. The complexity and associated large amounts of paperwork involved in a relocation make it very difficult, even for the most organized and diligent relocation coordinator, to stay fully abreast of each assigned relocation. Because of this, additional relocation coordinators are often hired which further increases the company's relocation expenses.

Problems arise when transferees inquire as to the status of their relocation and relocation coordinators must manually search the files to determine the current status of the relocation. If the assigned relocation coordinator is not available and a transferee needs answers now, other relocation coordinators are often unable to expediently answer the transferee's questions, or worse, may give incorrect answers. Relocations are stressful times for the transferee and the inability to get answers is especially troubling during this time of heightened stress.

Relocation coordinators tend to develop their own methods of coordinating and tracking relocations. This non-uniformity makes it very difficult to effectively implement new company relocation policies and procedures. The non-uniformity also increases the likelihood that when a transferee's relocation coordinator is unavailable, other relocation coordinators will be unable to assist the transferee.

Often, a company will purchase the transferee's home and will hire a real estate broker to sell the home. Manual record keeping makes it difficult to track the homes in inventory and to ensure that a home does not stay on the market for an extended period of time resulting in losses to the company. Manual record keeping also makes it difficult to track the performance of real estate brokers, appraisers, and title companies involved in the buying and selling of transferee's homes. This problem is compounded by the fact that these types of records must be maintained for the various possible locations a company may transfer its employees.

SUMMARY OF THE INVENTION

From the foregoing it may be appreciated that a need has arisen for an automated relocation tracking system and method for tracking a relocation so that a relocation can be efficiently and uniformly tracked. In accordance with the present invention, a relocation tracking system and method for tracking a relocation is provided that fully integrates the relocation tracking process into one system so that relocation information may be conveniently accessed, updated, and processed. This allows current information to be viewed at anytime and ensures greater uniformity of procedures from one relocation coordinator to another. The present invention also significantly reduces the labor required to administer relocations resulting in substantial savings to a company.

According to an embodiment of the present invention, there is provided a relocation tracking system that includes a processor and a mass storage device for storing a relocation database. The relocation database includes a transferee table and a shipping table. The processor receives and processes a relocation request that provides information about the transferee and the authorized benefits that a transferee is to receive. The processor accesses and updates the transferee table and the shipping table in response to processing the relocation request.

The present invention provides various technical advantages. A technical advantage of the present invention includes the ability to easily track relocation information using a computer so that the relocation information may be conveniently accessed, updated, and processed. Another technical advantage of the present invention includes the integration of pertinent relocation information from the accounting and payroll systems with that of the relocation system so that expense information pertaining to vendor payments and transferee reimbursements can be conveniently accessed and monitored. Still another technical advantage of the present invention includes the ability to closely track homes in inventory so that homes do not stay in inventory for unduly extended periods of time. Yet another technical advantage includes the tracking of real estate broker/agents and appraisers from the various areas so that superior performing broker/agents and appraisers can be chosen to handle future relocations. The tracking of the real estate broker/agents also allows a company to provide real estate broker/agent referral services to non-relocating employees and others. Significant referral fees can be generated from such services. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Turning first to the nomenclature of the specification, the detailed description which follows is represented largely in terms of processes and symbolic representations of operations by conventional computer components, including a central processing unit ("CPU") or processor associated with a general purpose computer system, memory storage devices for the CPU, and connected display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. The operations described herein are machine operations performed in conjunction with input from a human operator or user interacting with the computer.

In addition, it should be understood that the programs, processes, methods, etc. described herein are not related or limited to any particular computer or apparatus. Rather, various types of general purpose computing machines or devices may be used with programs constructed in accordance with the teachings described herein. Similarly, it may prove advantageous to construct specialized apparatus to perform the method steps described herein by way of dedicated computer systems with hardwired logic or programs stored in non-volatile memory, such as read only memory.

Figure 1:
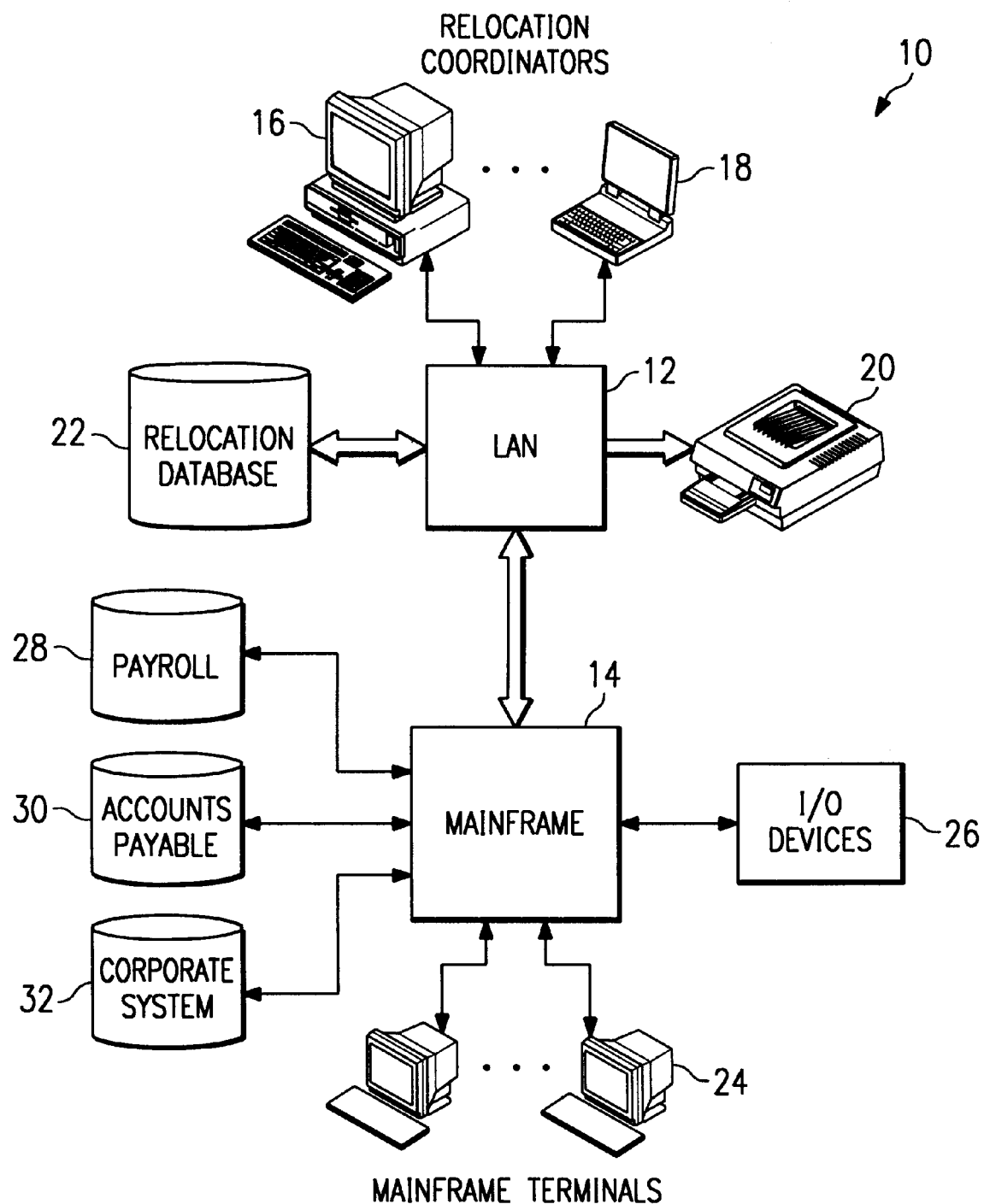
FIG. 1 is a diagram illustrating a relocation tracking system.

Referring now in more detail to the drawings, FIG. 1 is a diagram of an implementation of a relocation tracking system 10 of the present invention. Relocation tracking system 10 includes a local area network ("LAN") 12 that interfaces with a relocation database 22 so that information stored in relocation database 22 may be selected, displayed, updated, and processed. The users of relocation tracking system 10 are referred to herein as relocation coordinators. The relocation coordinators access relocation tracking system 10 through LAN 12.

LAN 12 is a network of computers and other devices dispersed over a relatively limited area and connected by a communications link that enables any device to interact with any other device on the network. LAN 12 may include microcomputers and shared resources such as laser printers and large hard disks. LAN 12 can support a wide variety of computers and other devices. Each device of LAN 12 must use the proper physical and data-link protocols for the particular implementation of LAN 12. LAN 12 may be linked by bridges to similar types of LAN's or by gateways to dissimilar types of LANs and networks.

The devices of LAN 12 are known as nodes and are connected by cabling, such as twisted-pair wiring, coaxial cable, and fiber-optic cable. Depending on the type of LAN desired, the nodes of LAN 12 may be wired together in any basic topology including those known as "bus," "ring," and "star."

LAN 12 may be implemented as a distributed network so that the various functions of LAN 12 are handled by the separate devices at each node rather than by a single main computer. LAN 12 may also be configured so that centralized processing takes place in a single or centralized place such as at a file server.

Any of a variety of computers may serve as devices at the nodes of LAN 12. Additionally, LAN 12 may provide for remote access such as by a personal computer 16 or a notebook computer 18 as shown in FIG. 1. Personal computer 16 and notebook computer 18 may access LAN 12 through either a direct connection or through a remote connection. A printer 20 is also provided as an output device of LAN 12 so that paper copies of the various tables and displays of relocation database 22 may be generated.

Although FIG. 1 illustrates the implementation of relocation tracking system 10 using LAN 12, in actual practice, relocation tracking system 10 may be implemented on any type of computer system such as a single personal computer, a workstation, a minicomputer, or a mainframe computer and is not limited to the use of only a LAN.

In the embodiment of relocation tracking system 10 shown in FIG. 1, a mainframe computer 14 is in communication with LAN 12 so that information may be provided from mainframe computer 14 to LAN 12 and ultimately to relocation database 22. Mainframe 14 preferably includes a variety of applications such as a payroll application 28, an accounts payable application ("AP") 30, and a corporate system 32. A user of mainframe computer 14 interacts with mainframe computer 14 through a variety of mainframe terminals 24. Various I/O devices 26 are also provided to mainframe computer 14. I/O devices 26 may include printers, mass storage devices, floppy disk drives, and any number of other hardware devices used to either provide information to mainframe computer 14 or to receive information from mainframe computer 14, or both.

Payroll application 28 includes an executable program and an associated database that stores and provides information relating to employees' paychecks. The database used by payroll application 28 may include such information as an employee's social security number, an employee's identification number, an employee's salary or hourly rate, an employee's tax information, an employee's overtime, and any other information relating to deductions or additions to an employee's paycheck. For example, when a relocating employee ("transferee") submits reimbursable relocation expenses, these may be reimbursed through the transferee's paycheck using payroll application 28.

AP 30 also includes an executable program and an associated database. In general, the database associated with AP 30 includes all information needed to maintain accounting records with respect to money owed by a company. Various departments and divisions of a company normally have unique account numbers so that expenses may be tracked by department and by the type of expense. With respect to a relocation, AP 30 preferably tracks such information as vendor expenses associated with a relocation, sundry paid expenses, and employee reimbursable expenses. AP 30 and payroll application 28 are part of a company's total accounting system.

Corporate system 32 also includes an executable program and an associated database. Depending on the company and the type of business, corporate system 32 may include any of a variety of applications needed to support the particular computer application needs of the company. For example, corporate system 32 may include an application that allows a manager to initiate a relocation request by filling out an input screen identifying the transferee and the associated authorized benefits. Corporate system 32 preferably also includes an employee database having such information as employee social security numbers, employee identification numbers, employee addresses, employee phone numbers, employee job titles, etc. Thus, those accessing mainframe computer 14 that have appropriate privileges may access a particular employee's record containing basic information such as the employee's social security number, phone number, and job title.

The information provided in the databases associated with payroll application 28, AP 30, and corporate system 32 may be downloaded to LAN 12 either in a batch mode or on demand. LAN 12, while executing a relocation tracking program 38, receives, processes, and stores this downloaded information in relocation database 22.

Relocation tracking system 10, in the embodiment of FIG. 1, tracks the relocation of an employee in the following manner. The manager of the transferee initiates a relocation request by accessing mainframe computer 14 through one of the mainframe terminals 24. The manager then accesses corporate system 32 and submits a relocation request. In submitting the relocation request, the manager enters pertinent information concerning the relocation. This information may include such information as the transferee's employee number, the relocation origination and destination locations, the transferee's mailing address, fax number, and the projected relocation date. Other information is also generally provided such as the reason for the move, the "from job code," the "to job code," the prior organization's identification, and the gaining organization's identification. However, all that is required is enough information to identify the transferee.

In addition to this information, the manager also enters the authorized benefits of the relocation. The authorized benefits may include such benefits as a miscellaneous move allowance, temporary living and travel benefits, shipping benefits, home selling benefits, and home buying benefits. Once entered, the relocation request is then approved by a relocation administrator also using mainframe computer 14.

The relocation request along with the associated transferee information and authorized benefits information are then provided from mainframe computer 14 to LAN 12. Once received at LAN 12, relocation tracking program 38, shown in FIG. 2, receives, processes, and updates certain tables of relocation database 22 so that the relocation may then be tracked by relocation tracking system 10. For example, relocation tracking program 38 generates a record in transferee table 44 and shipping table 48, shown in FIG. 2, in response to receiving the relocation request and associated transferee and authorized benefits information. Furthermore, relocation tracking program 38 may also generate records in other tables of relocation database 22 in response to receiving the relocation request and associated information. For example, a record is generated in a home selling table 50 or a home buying table 52, also shown in FIG. 2, when the authorized benefits information, provided with the relocation request, indicates that the transferee is entitled to either home selling benefits or home buying benefits, respectively.

Now that a relocation request has been received and relocation tracking program 38 has updated relocation database 22 in preparation for tracking a relocation, a relocation coordinator is assigned to the relocation and the transferee is contacted. The relocation coordinator accesses relocation tracking program 38 on LAN 12 either locally or remotely through personal computer 16 or notebook computer 18. As the relocation progresses from beginning to end, the relocation coordinator tracks the various steps and events of the relocation by using relocation tracking program 38 to select, update, and process the information related to the relocation that is stored on relocation database 22. The relocation coordinator receives information on the relocation from the transferee and from payroll application 28, AP 30 and corporate system 32 throughout the pendency of the relocation. The relocation coordinator and the transferee exchange relocation information throughout the relocation, much of which is provided to relocation database 22.

Throughout the relocation process, the transferee submits various reimbursable relocation expenses to accounting for reimbursement. These expenses are ultimately reflected in relocation database 22 in the following manner. The transferee submits the reimbursable expense and the database associated with payroll application 28 is ultimately updated so that the transferee's paycheck will reflect the reimbursable relocation expense amounts. This expense information is also reflected in AP 30 and ultimately provided to relocation database 22 through the link between mainframe computer 14 and LAN 12.

Relocation expenses that are not paid directly by the transferee, such as shipping expenses, are billed directly to the company. These expenses are reflected in relocation database 22 in the following manner. An invoice is provided to the company by the entity or vendor providing the services. The invoice is entered into the company's accounting system and is ultimately reflected in AP 30 as a relocation expense. The appropriate department, organization, or division within the company may be billed for these relocation expenses. These expenses are ultimately reflected in relocation database 22 when mainframe computer 14 provides the information to relocation tracking program 38 of LAN 12 which updates relocation database 22. In this manner, the relocation coordinator may monitor all expenses associated with the relocation by accessing relocation database 22. It should also be understood that the present invention may be used by an outside company providing relocation tracking services to track the relocations of another company.

Although the embodiment of relocation tracking system 10 has been illustrated in FIG. 1 as including mainframe computer 14 and LAN 12, relocation tracking system 10 is not limited to such an arrangement. For example, relocation tracking system 10 may be implemented on one computer system such as a single personal computer or on a distributed system such as a local area network or a combination thereof. Payroll application 28, AP 30, and corporate system 32 may all be implemented in one system that includes relocation tracking system 10. In this manner, the relocation request would be provided and approved all on one computer system. Relocation tracking system 10 may be implemented using a multi-user system so that multiple relocation coordinators may use the system, as a single user, fully stand-alone system, or in any of a variety of other systems.

Figure 2:
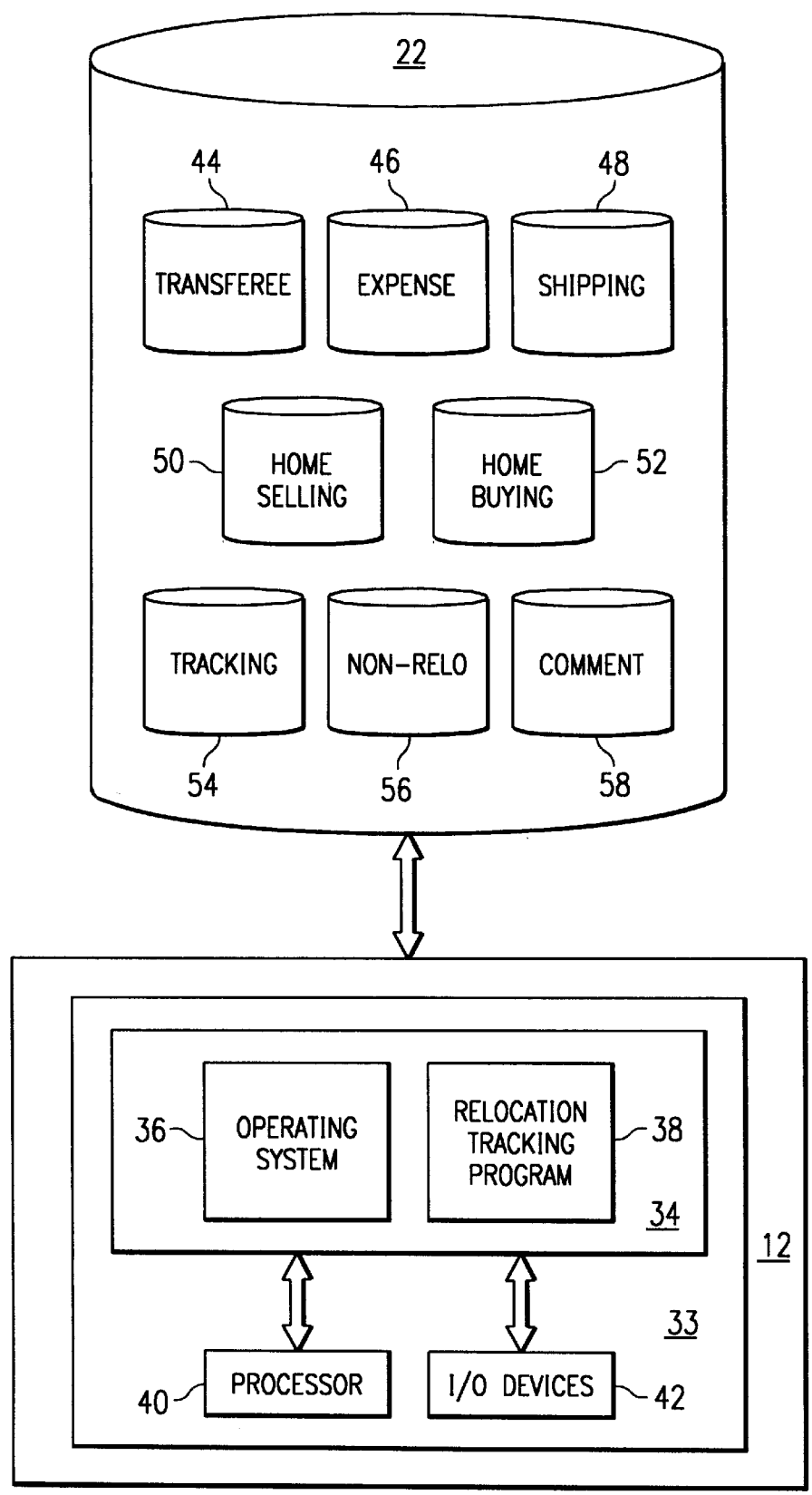
FIG. 2 is a diagram illustrating an example of a local area network and a relocation database of such relocation tracking system in more detail.

FIG. 2 is a diagram illustrating LAN 12 and relocation database 22 in more detail. LAN 12 includes a server 33 having a memory 34, such as a random access memory ("RAM"), a processor 40, such as an INTEL or MOTOROLA microprocessor, and various I/O devices 42. I/O devices 42 may be any piece of hardware that is used for either providing information to LAN 12 or receiving information from LAN 12, or both.

Server 33 is a computer such as a personal computer, workstation, minicomputer, or any other computer capable of running software that controls access to all or part of LAN 12 and its resources. Server 33 is accessible to all users of LAN 12 and manages a variety of requests from the users including requests for files and for file storage. Server 33 operates under the control of operating system 36 which is stored in memory 34. Operating system 36 may be a network operating system that coordinates the activities for providing services to the computers and other devices attached to LAN 12. Operating system 36 must acknowledge and respond to requests from the devices of LAN 12 and manage such details as network access, communications, resource allocation and sharing, data protection, and error control. Operating system 36 may be implemented using any of a variety of network operating systems such as NETWARE by NOVELL or WINDOWS NT by MICROSOFT. Any of a variety of application programs may be executed by server 33. The various clients or computers of LAN 12 may operate locally under the control of any of a variety of operating systems such as WINDOWS, WINDOWS 95, OS/2, DOS and XENIX.

Relocation tracking program 38 is shown stored in memory 34. Depending on how LAN 12 is implemented, relocation tracking program 38 may be executed at server 33 or may be provided to a client computer of LAN 12 and executed locally. In either event, relocation tracking program 38 will be stored in a memory which is then accessible by a processor such as processor 40. As discussed above, relocation tracking system 10 may be implemented on any of a variety of computer systems, such as a single personal computer. Thus, it should be understood that the description of server 33 and relocation tracking program 38 applies equally to the situation where relocation tracking system 10 is implemented on a single personal computer.

Processor 40, under the control of operating system 36, is used to retrieve, process, store, and display data. Processor 40 communicates control, address, and data signals with operating system 36 and with the remaining components of server 33 through a system bus. Processor 40 may include an arithmetic logic unit to assist processor 40 in performing mathematical operations. Processor 40 interprets and executes instructions that have been fetched or retrieved from memory 34 and may be implemented as a single integrated circuit or as a combination of integrated circuits.

Relocation tracking program 38 is an application program that allows a user to select, display, and update information stored in relocation database 22. Initially, relocation tracking program 38 receives a relocation request from mainframe computer 14. In response to receiving the relocation request and associated information, relocation tracking program 38 processes the relocation request and updates or initializes relocation database 22 in preparation for tracking the relocation. After relocation database 22 has been updated or initialized, relocation tracking program 38 is used to select, update, and process relocation database 22 throughout the duration of the relocation. Relocation coordinators use relocation tracking program 38 to track the various relocations assigned to them. Relocation coordinators may also track relocations assigned to other relocation coordinators who may be unavailable.

Operating system 36 and relocation tracking program 38 are stored in a mass storage device, such as a hard disk drive. Operating system 36 is loaded into memory 34 during initialization of server 33 and relocation tracking program 38 is loaded into memory 34 when selected by a relocation coordinator.

Relocation tracking program 38 may be implemented using any of a variety of program languages and may provide a graphical user interface. The graphical user interface allows a relocation coordinator to conveniently navigate relocation tracking program 38 by selecting various options provided by the graphical user interface.

Relocation database 22 may be accessed by the relocation coordinators using relocation tracking program 38. Relocation database 22 is stored on a mass storage device. A database management system, not shown in FIG. 2, could also be used to interface with relocation tracking program 38 so that the data of relocation database 22 may be more easily selected, updated, and processed by relocation tracking program 38. A variety of commercially available database management systems may be used such as SYSTEM 10 by SYBASE or ACCESS by MICROSOFT. Whenever a database management system is used, relocation tracking program 38 generates commands that are passed to the database management system so that relocation database 22 may be selected, displayed and updated by relocation tracking program 38.

The structure of relocation database 22 may be logically divided into eight main areas for storing information pertinent to a relocation. These eight areas may in reality overlap and include some of the same information. The eight areas generally correspond to information tracked during a relocation and the various functions performed by relocation tracking program 38. Furthermore, each of the areas may be implemented as a single table or as a variety of individual tables. In the embodiment of FIG. 2, relocation database 22 includes a transferee table 44, an expense table 46, a shipping table 48, a home selling table 50, a home buying table 52, a tracking table 54, a non-relocation table 56, and a comment table 58.

Transferee table 44 may be implemented as a single table or as multiple tables. Transferee table 44 and its relationship with relocation tracking program 38 are described in more detail in connection with FIG. 4. Generally, transferee table 44 may include transferee information, authorized benefits, job information, and expense billing information.

Expense table 46 may be implemented as a single table or as multiple tables. Expense table 46 and its relationship with relocation tracking program 38 are described in more detail in connection with FIG. 5. More generally, expense table 46 may include individual expenses associated with a relocation and expense summary information.

Shipping table 48 may also be implemented as a single table or as a variety of tables. Shipping table 48 and its relationship with relocation tracking program 38 are described in more detail in connection with FIGS. 6, 7, and 8. Generally, shipping table 48 may include shipping information such as origination and destination information, vanline information, and self drive information. Self drive information includes information relating to a relocation in which a transferee rents and drives a truck, such as a UHAUL, instead of using a vanline for shipping.

Home selling table 50 may also be implemented as a single table but will generally include multiple tables. Home selling table 50 and its relationship with relocation tracking program 38 are described more fully in connection with FIGS. 9, 10, 11, 12, 13, 14, and 15. Home selling table 50 may include such information as home selling initiation information, real estate broker/agent listing information, lien information, title company information, equity information, home inventory information, market analysis information, appraiser information, and spread summary analysis information.

Home buying table 52 may be implemented as a single table or as a variety of tables. Home buying table 52 and its relationship with relocation tracking program 38 are described in more detail in connection with FIG. 16. Generally, home buying table 52 may include information concerning home buying information, home buying benefits, and cancellations of such benefits.

Tracking table 54 may be implemented as a single table or as a variety of tables. Tracking table 54 and its relationship with relocation tracking program 38 are described more fully in connection with FIG. 17. More generally, tracking table 54 may include appraiser tracking information, real estate broker/agent tracking information, and title company tracking information.

Non-relocation table 56 may be implemented as a single table or as a variety of tables. Non-relocation table 56 and its relationship with relocation tracking program 38 are described in more detail in connection with FIG. 18. Non-relocation table 56 includes non-relocation referral information.

Finally, comment table 58 may be implemented as a single table or as multiple tables. Comment table 58 and its relationship with relocation tracking program 38 are described in more detail in connection with FIG. 19. Generally, comment table 58 includes text and comment information concerning all aspects of relocation tracking system 10.

Figure 3:
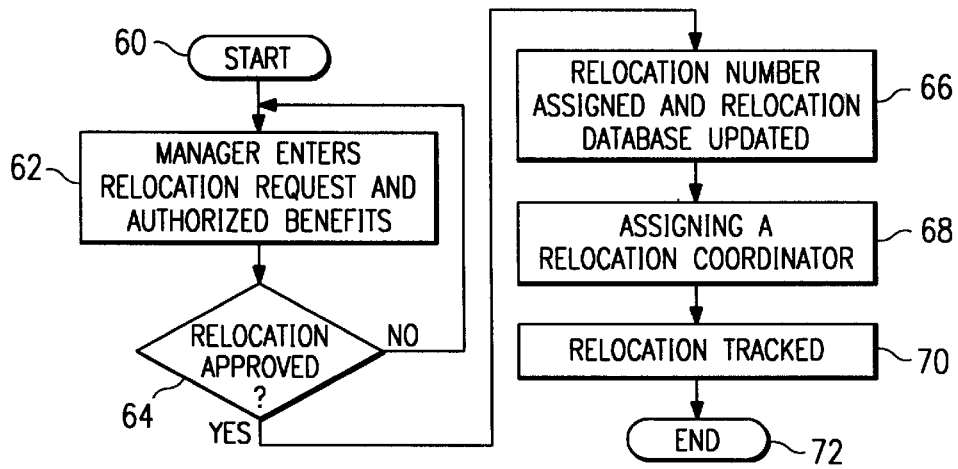
FIG. 3 is an overview flow chart illustrating a method for tracking a relocation using the relocation tracking system of the present invention.

FIG. 3 is an overview flow chart outlining a method for tracking a relocation using relocation tracking system 10. The method begins at step 60 and proceeds next to step 62 where a manager, such as the transferee's manager, accesses the relocation tracking system and enters a relocation request. By entering the relocation request, the manager authorizes certain relocation benefits. After the manager submits the relocation request and associated authorized benefits, the method proceeds to decision block 64.

Decision block 64 waits for the relocation to be approved before proceeding. Normally, a relocation administrator or upper management personnel reviews the request and either approves or disapproves the request. If the relocation request is not approved, decision block 64 proceeds along the "no" branch and the request must be resubmitted by a manager. Once the relocation request is approved, the method proceeds along the "yes" branch of decision block 64.

The method then continues at step 66 where a relocation number is assigned to the relocation and relocation database 22 is updated. The update of relocation database 22 is dependent partially on the authorized benefits. For example, relocation database 22 is updated with transferee information and shipping information for every relocation. However, relocation database 22 may only be updated with other information, such as home selling information and home buying information, if such benefits are authorized by the transferee's manager in step 62. The method next proceeds to step 68 where a relocation coordinator is assigned. A relocation coordinator is generally an employee in the relocation department that will work with the transferee throughout the relocation.

The method proceeds next to step 70 where the relocation is tracked by the relocation coordinator using relocation tracking system 10. Relocation tracking program 38 and relocation database 22, both of FIG. 2, are together used to track the various events of the relocation as they occur. As the relocation proceeds, the relocation coordinator enters various information related to the relocation into relocation tracking program 38 which processes the information and stores the information in relocation database 22. Expense and accounting relocation information are also provided to relocation tracking program 38 during the relocation. Relocation tracking program 38 processes the relocation information and allows a relocation coordinator to closely monitor and effectively manage a relocation. Step 72 signifies the end of the method.

FIGS. 4–19 illustrate one embodiment of relocation tracking program 38 in which relocation tracking program 38 provides various menus and input screens for selecting, displaying, and updating relocation database 22 during a relocation. Relocation tracking program 38 also provides processing to relocation database 22.

Relocation database 22 is described in association with these FIGURES. The description of relocation database 22 has been divided into the eight areas shown and discussed in connection with FIG. 2. Some of the eight areas are further sub-divided into logical sub-divisions. The present invention should not be construed to be limited to the divisions in the embodiment illustrated by FIGS. 4–19. On the contrary, many different embodiments may be provided that are within the scope of the present invention.

Figure 4:
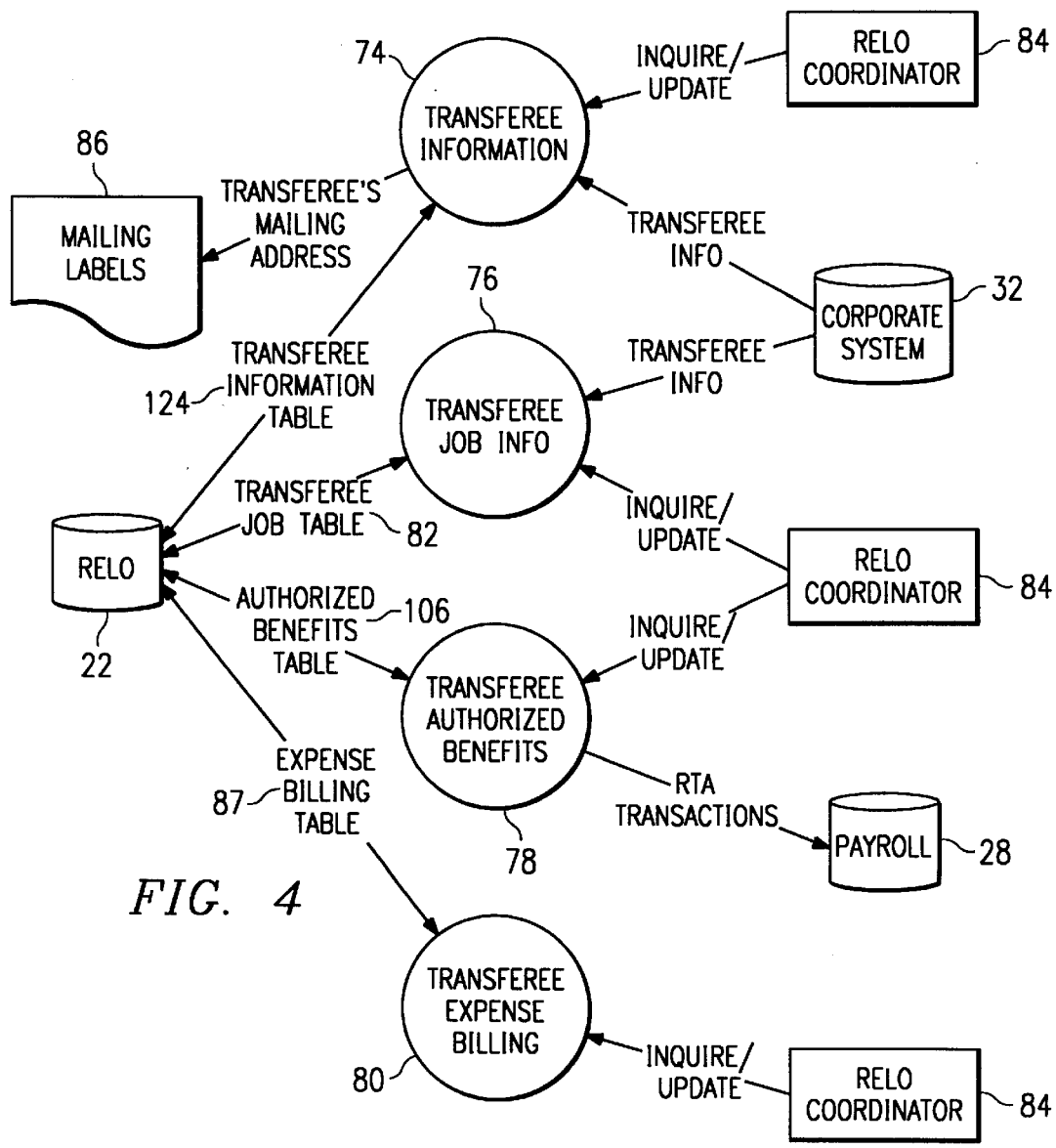
FIG. 4 is an information flow diagram illustrating the selection and update of a transferee table.

FIG. 4 is an information flow diagram illustrating the selection, update, and processing of transferee table 44 of relocation database 22 by relocation tracking program 38. At this point in the relocation process, a relocation request has been received by relocation tracking program 38 and a record has been generated in transferee table 44, shipping table 48, and other tables in which benefits have been authorized. Shipping table 48 is described more fully below in connection with FIGS. 6, 7, and 8.

The information of transferee table 44 may be viewed and updated by selecting either transferee information selection point 74, transferee job information selection point 76, transferee authorized benefits selection point 78, or transferee expense billing selection point 80. These selection points may be implemented as menus in relocation tracking program 38. Transferee table 44 may be implemented as one table or as multiple tables and may include all or some of the information associated with these selection points. FIG. 4 illustrates an implementation of transferee table 44 that includes a transferee information table 124, a transferee job table 82, an authorized benefits table 106, and an expense billing table 87.

Referring now to transferee information selection point 74, relocation coordinator 84 selects or accesses transferee information selection point 74 for viewing and updating. Transferee information selection point 74 may receive or transmit information to relocation database 22. Specifically, relocation coordinator 84 and corporate system 32 provide input data that is passed to relocation database 22 and stored as transferee information table 124. The information provided through transferee information selection point 74 includes such information as the transferee's employee number, the relocation identification number, the origination and destination locations, the transferee's mailing address, transferee's fax number, and any other information used to identify the transferee.

Relocation tracking program 38 may generate mailing labels 86 using the information from transferee information table 124. Relocation tracking program 38 may also generate and provide a mail merge file including information from relocation database 22. This information could then be used by a word processing program to generate a letter or by an electronic facsimile program so that the mail merge file could be faxed.

Referring now to transferee job information selection point 76, information is provided to transferee information selection point 76 from corporate system 32 and relocation coordinator 84. Transferee job information selection point 76 provides the information to relocation database 22 and stores the information in transferee job table 32. Relocation coordinator 84 may view and update this information. The information of transferee job table 82 may include the transferee's prior manager and new manager, the transferee's prior phone number and new phone number, and the transferee's prior and new job description code. The organizational identification number of the organization responsible for paying for the transferee's move may also be provided.

Focusing now on transferee authorized benefits selection point 78, relocation coordinator 84 selects or accesses transferee authorized benefits selection point 78 for viewing and updating of authorized benefits table 106. Information is provided to this selection point from relocation coordinator 84, and from the original relocation request supplied from mainframe computer 14. Relocation tracking program 38 may generate a relocation tax file and provide the file to payroll application 28. The relocation tax file outlines taxable relocation benefits that the transferee received so that a transferee may be compensated through payroll application 28 for any adverse tax consequences the relocation may have on the transferee's taxes.

Transferee authorized benefits selection point 78 provides the information to relocation database 22 and stores the information in authorized benefits table 106. The information of authorized benefits table 106 was discussed previously in connection with FIGS. 1 and 2 and may include such things as a miscellaneous move allowance benefit, a travel and temporary living benefit, a shipping benefit, a home selling benefit, and a home buying benefit.

Referring next to transferee expense billing selection point 80, information is provided to this point from relocation coordinator 84 and from the original relocation request. Transferee expense billing selection point 80 then provides the information to relocation database 22 in the form of expense billing table 87. Expense billing table 87 may include information related to the organization within the company that primarily is responsible for the relocation expenses. Relocation coordinator 84 may select or access expense billing selection point 80 for viewing and updating of expense billing information.

Thus, transferee table 44 may include a variety of tables such as transferee information table 124, transferee job table 82, authorized benefits table 106 and expense billing table 87. However, as mentioned above, transferee table 44 may be organized as multiple tables or as one table. Transferee table 44 is updated with a new record each time a relocation request is provided to relocation database 22. For example, a new record is added to transferee table 44 in response to receiving a relocation request.

Figure 5:
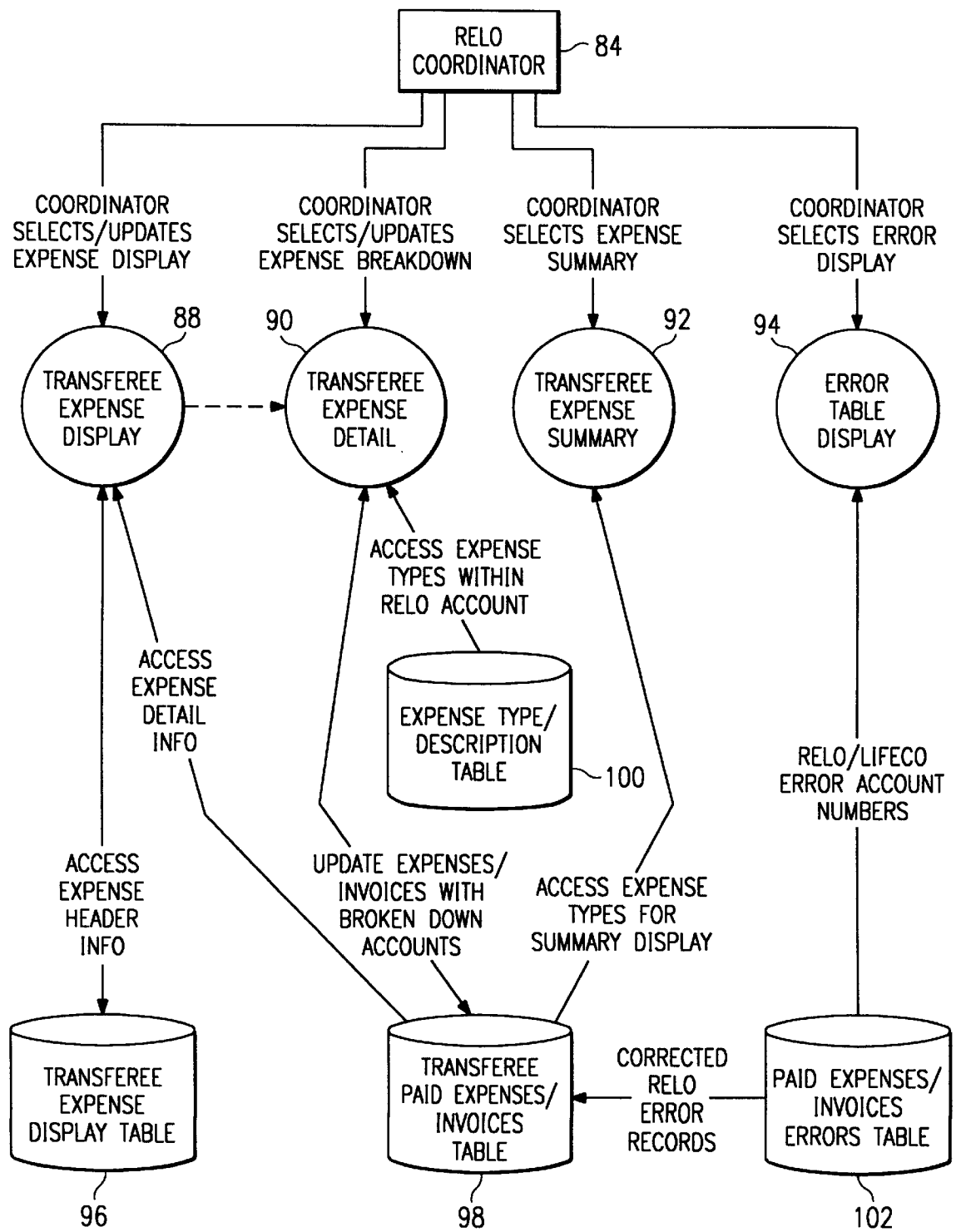
FIG. 5 is an information flow diagram illustrating the selection and update of an expense table.

FIG. 5 is an information flow diagram illustrating the selection, update, and processing of expense table 46 of relocation database 22 by relocation tracking program 38.

The information of expense table 46 may be viewed and selected information may be updated by selecting either transferee expense display selection point 88, transferee expense detail selection point 90, transferee expense summary selection point 92, or error table display selection point 94. The dotted arrow line from transferee expense display selection point 88 to transferee expense detail selection point 90 indicates that transferee expense detail selection point 90 is accessed from transferee expense display selection point 88. These selection points may be implemented in relocation tracking program 38 as menus for ease of access by relocation coordinator 84.

Expense table 46 may implemented as one table or as multiple tables and may include all or some of the information associated with these selection points. As shown in FIG. 1 and as discussed previously, much of the information stored in expense table 46 is provided to relocation database 22 from AP 30. FIG. 5 illustrates an implementation of expense table 46 that includes a transferee expense display table 96, a transferee paid expenses/invoices table 98, an expense type/description table 100, and a paid expenses/invoices errors table 102.

Focusing now on transferee expense display selection point 88 and transferee expense detail selection point 90, relocation coordinator 84 may select either of these selection points for viewing and updating of relocation expense related information. Transferee expense display selection point 88 may be used to view information from transferee expense display table 96 and transferee paid expenses/invoices table 98 and to update selected information on transferee expense display table 96. The information of transferee paid expenses/invoices table 98 was previously provided by AP 30. Transferee expense detail selection point 90 provides information to transferee paid expenses/invoices table 98 and receives information from this table and expense type/description table 100. Expense type/description table 100 provides such information as valid account numbers and their associated descriptions.

Referring next to transferee expense summary selection point 92, relocation coordinator 84 accesses this selection point and views a summary expense report with information provided from transferee paid expenses/invoices table 98. Relocation tracking program 38 processes the expense information of transferee paid expenses/invoices table 98 to generate the summary expense report of transferee expense summary selection point 92. Various categories of expenses are processed and displayed.

Referring finally to errors table display selection point 94, relocation coordinator 84 selects this point to view paid expenses/invoices errors table 102. Paid expenses/invoices errors table 102 is provided from AP 30 and contains relocation expenses that have not been assigned to a particular relocation identification number. This may occur when relocation expenses are submitted before a relocation request has been submitted and approved. Relocation coordinator 84 may view these expenses and update transferee paid expenses/invoices table 98 by assigning these expenses to a particular relocation identification number. In such a case, the corrected relocation records of paid expenses/invoices errors table 102 are then provided to transferee paid expenses/invoices table 98.

Thus, expense table 46 primarily allows the relocation coordinator to track relocation expenses while allowing the relocation coordinator to make certain changes to the expenses. Relocation tracking program 38 provides some processing to expense table 46 such as the generation of a summary expense report and the ability to assign previously unassigned expenses to their appropriate relocation expense.

Figure 6:
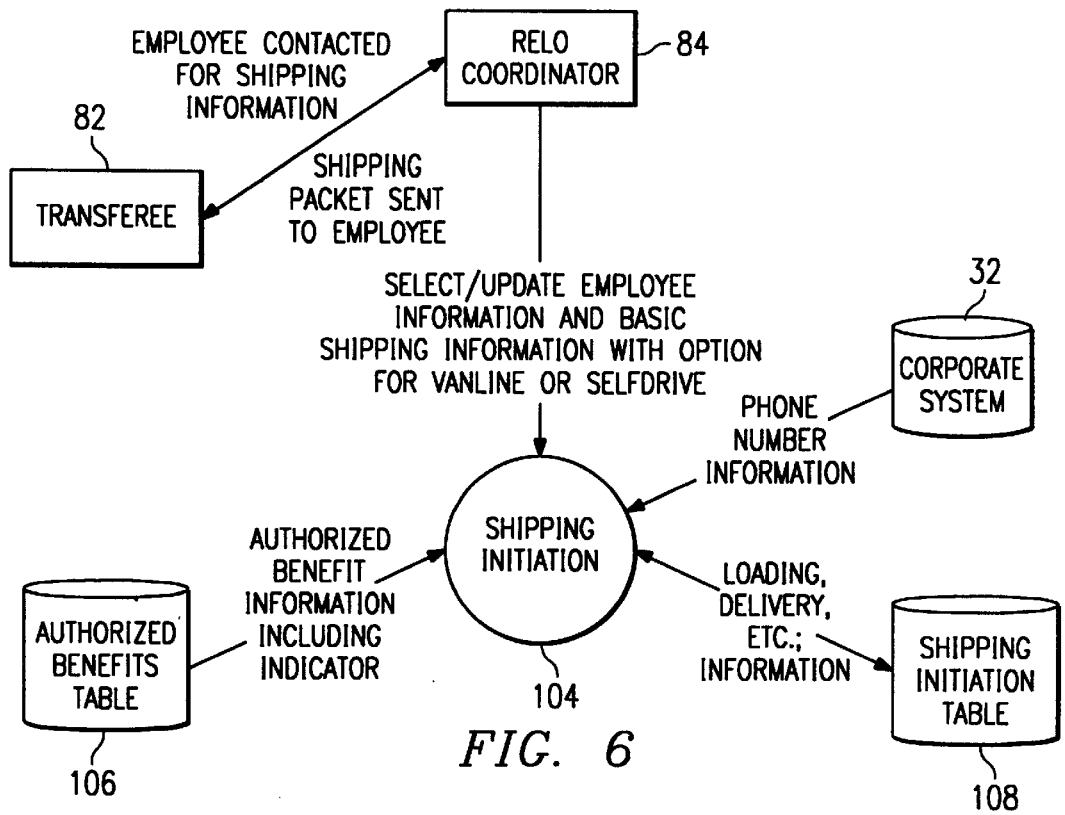
FIG. 6 is an information flow diagram illustrating the selection and update of a shipping table of shipping initiation information.
Figure 7:
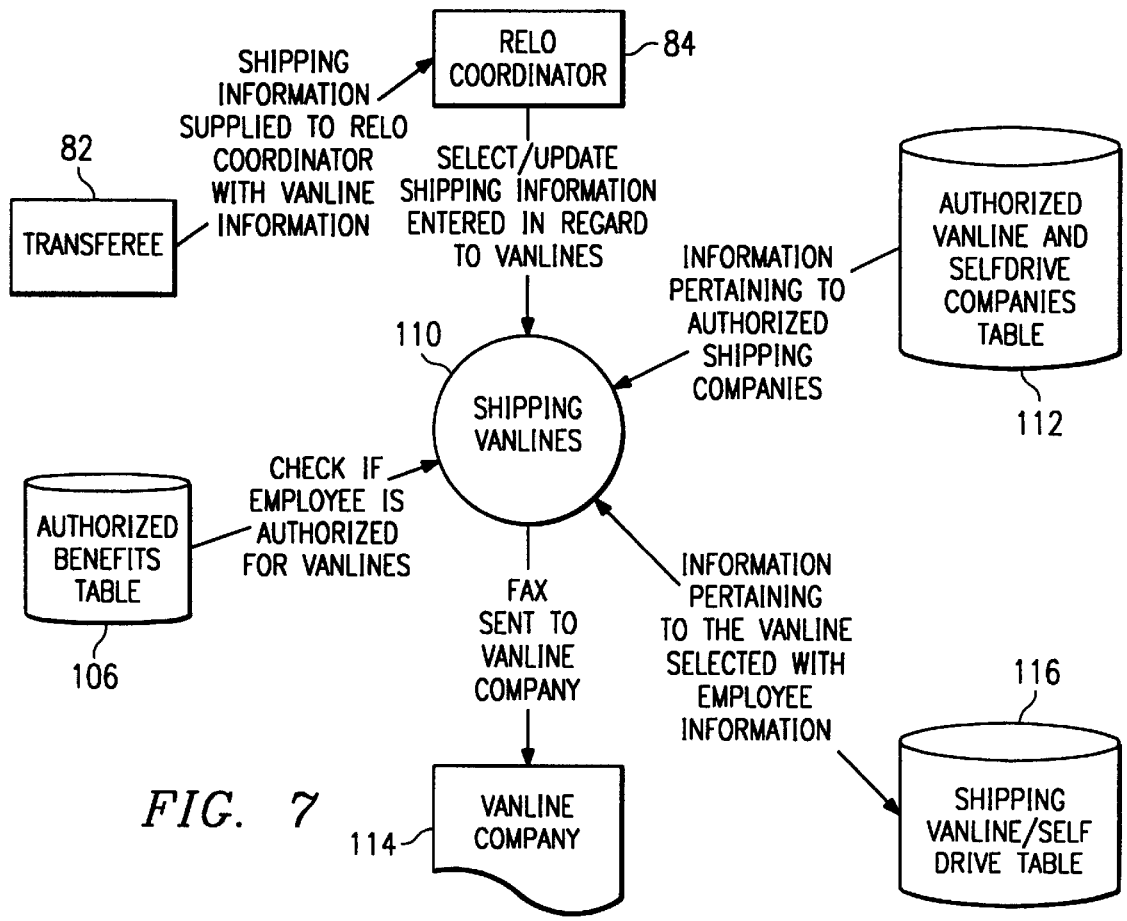
FIG. 7 is an information flow diagram illustrating the selection and update of the shipping table of shipping vanline information.
Figure 8:
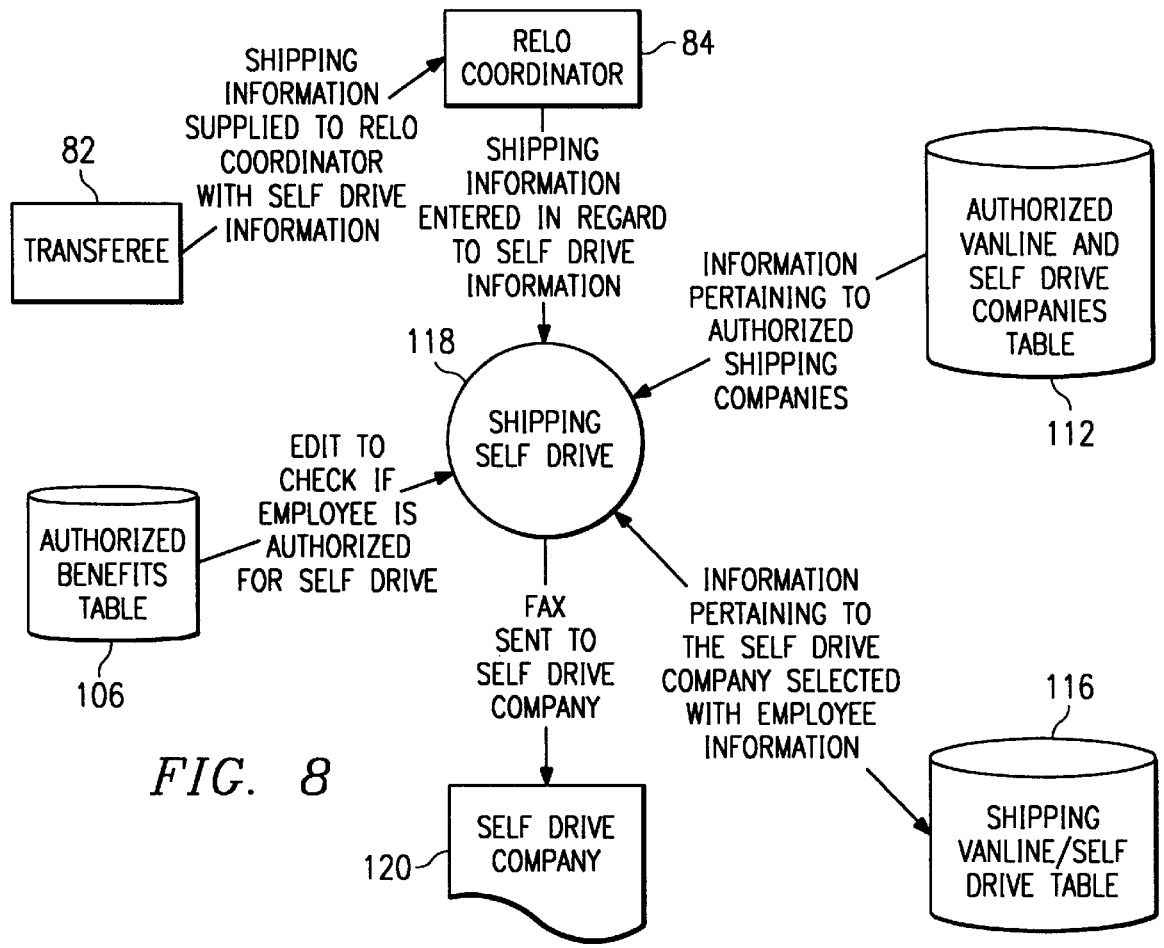
FIG. 8 is an information flow diagram illustrating the selection and update of the shipping table of shipping self drive information.

FIGS. 6, 7, and 8 are information flow diagrams illustrating the selection, update, and processing of shipping table 48 of relocation database 22 by relocation tracking program 38. Shipping table 48 may be selected and updated through shipping initiation selection point 104 of FIG. 6, shipping vanline selection point 110 of FIG. 7, and shipping self drive selection point 118 of FIG. 8. These selection points may be implemented in relocation tracking program 38 as menus and may be accessed and viewed by relocation coordinator 84. Shipping table 48 may be implemented as one table or as multiple tables and may include all or some of the information associated with these selection points. FIGS. 6, 7, and 8 illustrate an implementation of shipping table 48 that includes a shipping initiation table 108 and a shipping vanline/self drive table 116.

Focusing now on shipping initiation selection point 104, relocation coordinator 84 receives information from transferee 82 after providing transferee 82 with a shipping packet. Relocation coordinator 84 selects or accesses shipping initiation selection point 104 for viewing and updating. Relocation coordinator 84 provides shipping information, received from transferee 82, to shipping initiation table 108 through shipping initiation selection point 104. Relocation coordinator 84 may select and update shipping initiation table 108 with this information while also viewing such information as the transferee's phone number, originally provided by corporate system 32, and the transferee's authorized benefits from authorized benefits table 106 of transferee table 44. Relocation coordinator 84 may also view the transferee's shipping information from shipping initiation table 108, such as loading and delivery information, throughout the relocation process.

Focusing now on shipping vanlines selection point 110 of FIG. 7, transferee 82 and relocation coordinator 84 may exchange information with respect to vanline benefits and service. Relocation coordinator 84 selects or accesses shipping vanlines selection point 110 and provides vanline information to shipping vanline/self drive table 116 by assigning a vanline to a relocation. In making this selection, relocation coordinator 84 may view and update vanline information while also viewing information from authorized benefits table 106, to determine the transferee's authorized vanline benefits, and authorized vanline and self drive companies table 112, to view information pertaining to authorized shipping companies. The information in authorized vanline and self drive companies table 112 may also be updated by a relocation coordinator using shipping vanlines selection point 110. This information includes information identifying vanline and self drive companies.

Relocation coordinator 84 assigns a vanline to the relocation through shipping vanlines selection point 110. In response, relocation tracking program 38 updates shipping vanline/self drive table 116. Once a vanline company has been chosen, shipping vanlines selection point 110 may be used by relocation coordinator 84 to initiate the sending of a fax to a vanline company having all pertinent information as is illustrated by vanline company fax 114.

Referring now to shipping self drive selection point 118 of FIG. 8, transferee 82 and relocation coordinator 84 exchange information regarding shipping self drive information. Relocation coordinator 84 provides this information, via shipping self drive selection point 118, to shipping vanline/self drive table 116. Self drive information may include such information as a truck rental pick-up date, a truck rental size, and the authorized self drive companies such as UHAUL.

Relocation coordinator 84 may view and update self drive information through shipping self drive selection point 118 while also viewing information from authorized benefits table 106, to determine the transferee's authorized vanline benefits, and authorized vanline and self drive companies table 112, to view information pertaining to authorized self drive companies. Relocation coordinator 84 will then assign a self drive company for the relocation through shipping self drive selection point 118. Once assigned, the self drive company is provided to shipping vanline/self drive table 116. In doing this, relocation tracking program 38 generates a record in shipping vanline/self drive table 116 including the assigned self drive company information. Relocation coordinator 84, through shipping self drive selection point 118, may initiate the sending of a fax to an assigned self drive company that contains pertinent self drive information for a particular relocation as is illustrated by self drive company fax 120.

Thus, FIGS. 6, 7, and 8 illustrate the selection, update, and generation of shipping table 48. In addition to the selection and update of shipping table 48 during an actual relocation, shipping table 48 is updated with a new record as soon as a relocation request is received.

FIGS. 9, 10, 11, 12, 13, 14, and 15 are information flow diagrams illustrating the selection, update, and processing of home selling table 50 of relocation database 22 by relocation tracking program 38. Home selling table 50 may be selected and updated through home selling initiation selection point 122 of FIG. 9, listing information selection point 128 of FIG. 10, lien selection point 140 of FIG. 11, title company selection point 144 of FIG. 12, mortgage/equity/proceeds selection point 150 of FIG. 13, inventory selection point 156, offer out selection point 158, noninventory selection point 160 all of FIG. 14, and appraisal information selection point 166, and BMA information selection point 168 all of FIG. 15. These selection points may be implemented in relocation tracking program 38 as menus and may be accessed and viewed by relocation coordinator 84. Home selling table 50 may be implemented as one large table but will generally be implemented using multiple tables that each include all or some of the information associated with home selling and the above-mentioned selection points.

Figure 9:
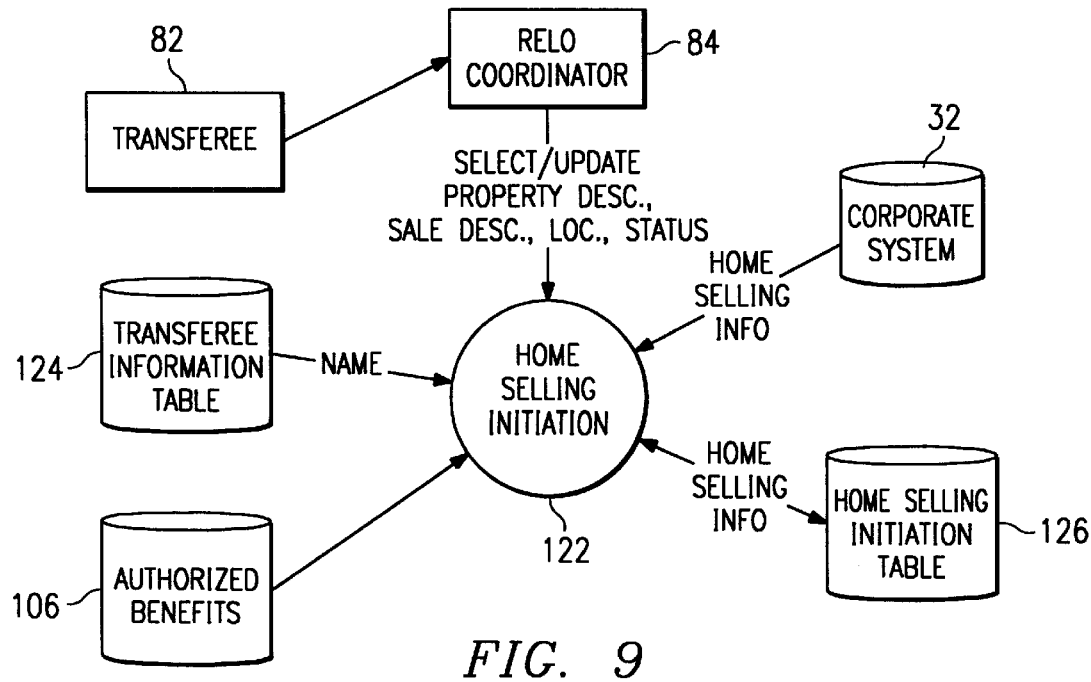
FIG. 9 is an information flow diagram illustrating the selection and update of a home selling table of home selling initiation information.
Figure 10:
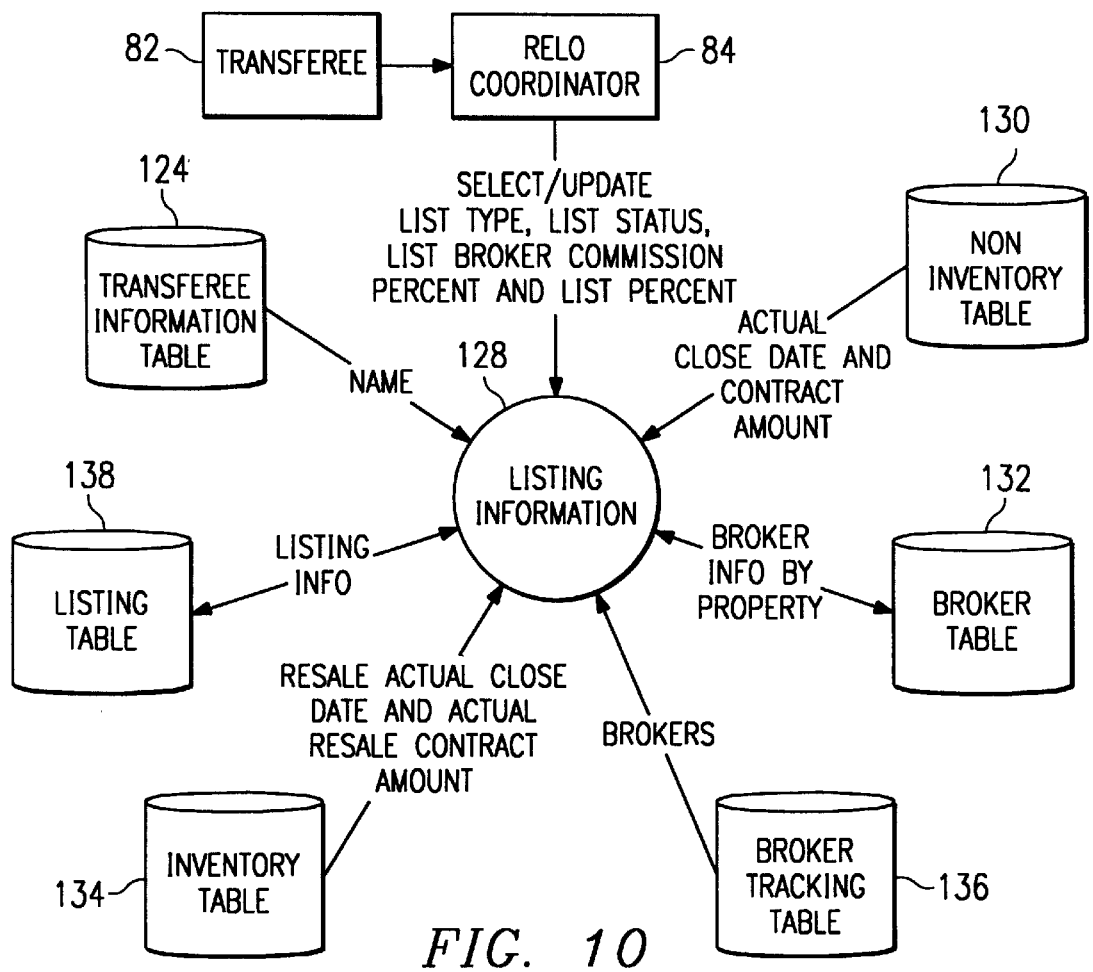
FIG. 10 is an information flow diagram illustrating the selection and update of the home selling table of listing information.
Figure 11:
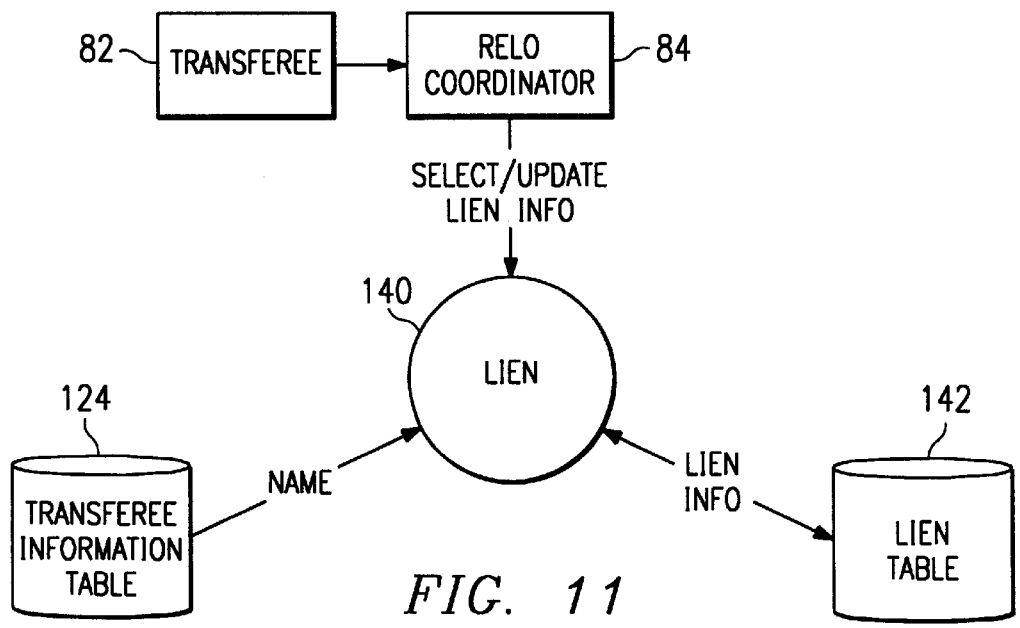
FIG. 11 is an information flow diagram illustrating the selection and update of the home selling table of lien information.
Figure 12:
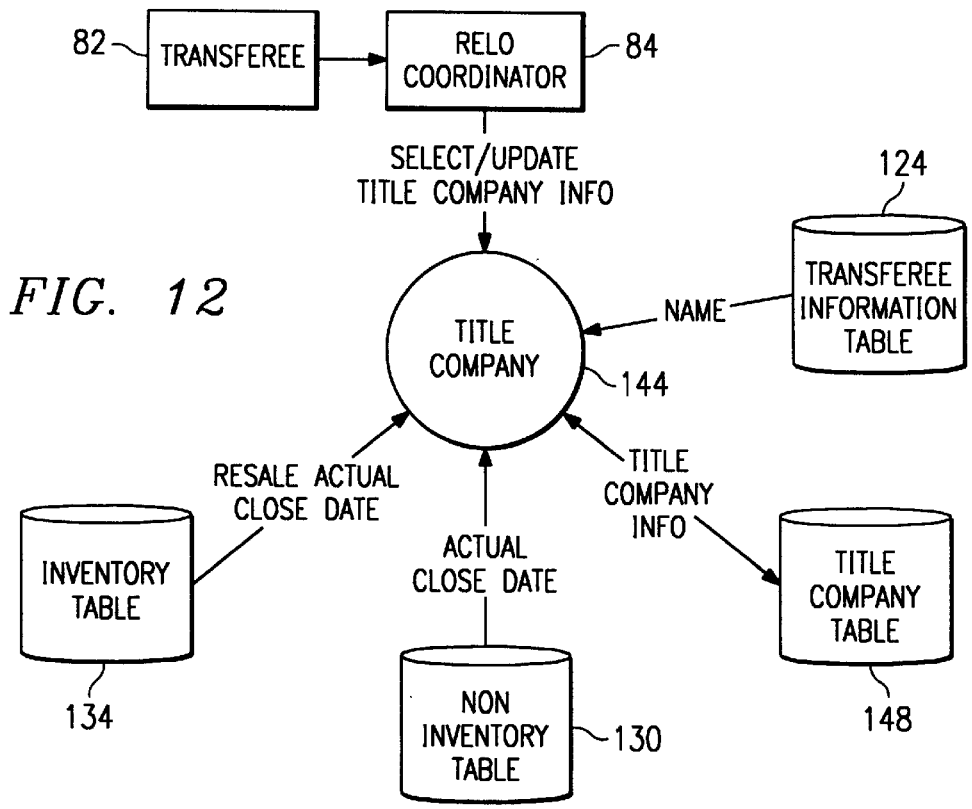
FIG. 12 is an information flow diagram illustrating the selection and update of the home selling table of title company information.
Figure 13:
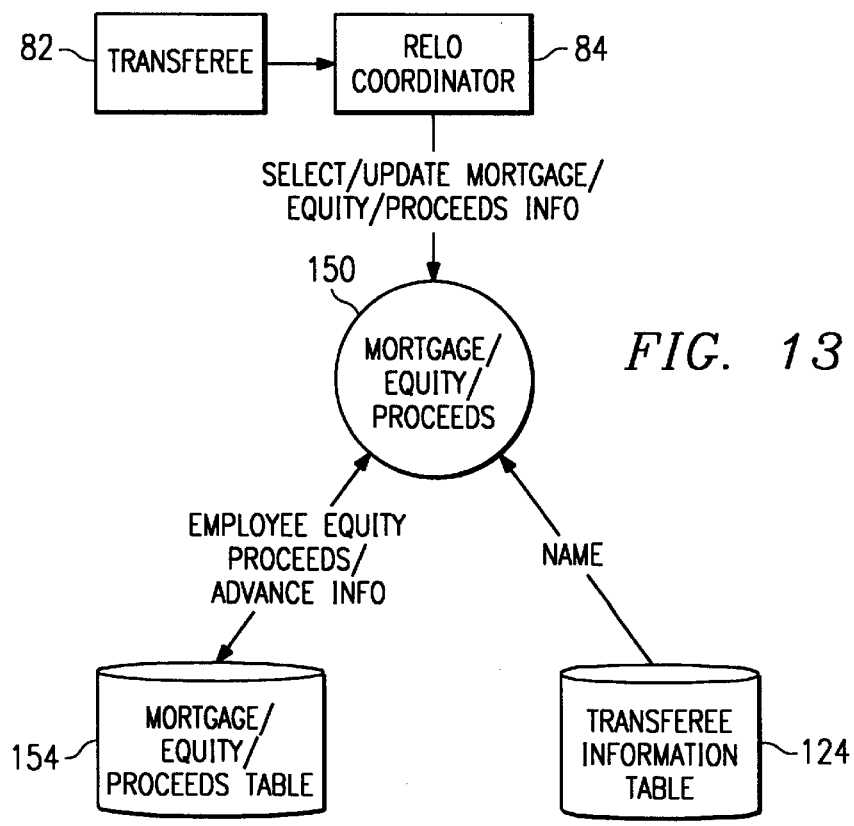
FIG. 13 is an information flow diagram illustrating the selection and update of the home selling table of mortgage/equity/proceeds information.
Figure 14:
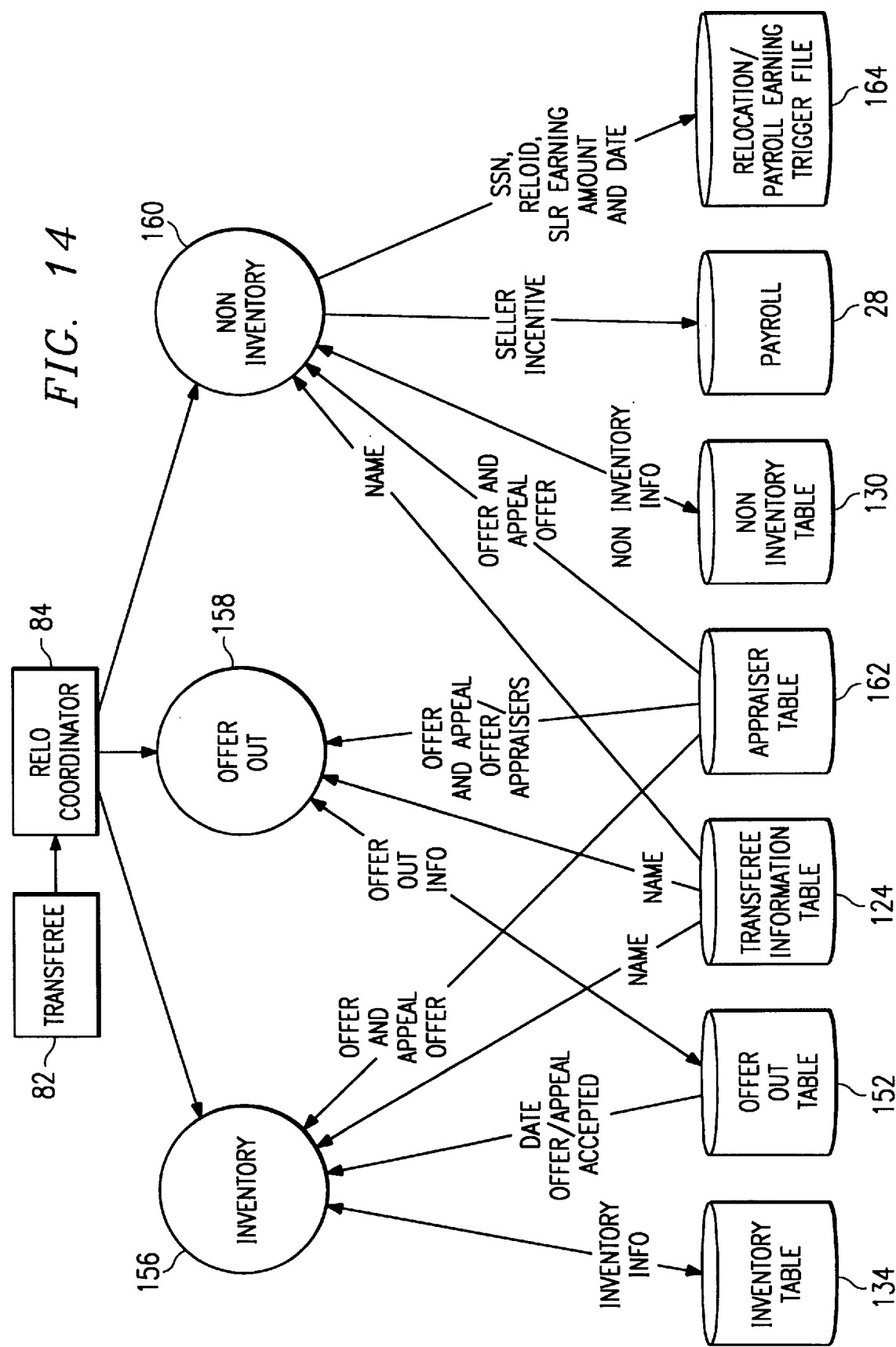
FIG. 14 is an information flow diagram illustrating the selection and update of the home selling table of inventory, offer out, and non inventory information.
Figure 15:
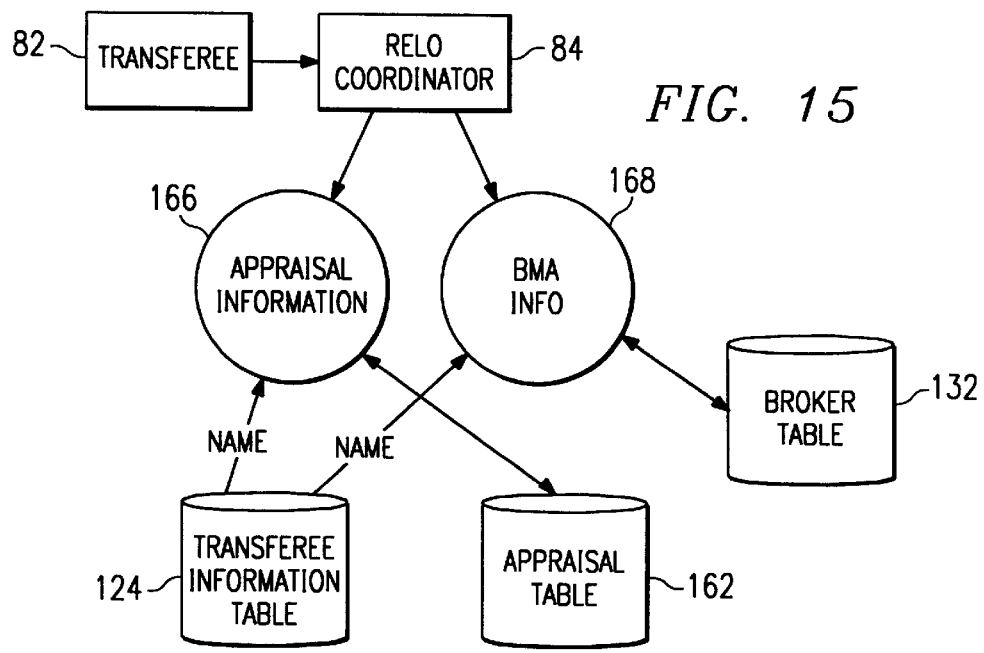
FIG. 15 is an information flow diagram illustrating the selection and update of the home selling table of appraisal information and broker market analysis information.

Home selling table 50 may be implemented using a variety of tables such as a home selling initiation table 126 of FIG. 9, a listing table 138 and a broker table 132 both of FIG. 10, a lien table 142 of FIG. 11, a title company table 148 of FIG. 12, a mortgage/equity/proceeds table 154 of FIG. 13, an inventory table 134, an offer out table 152, and a noninventory table 130 all of FIG. 14, and an appraisal table 162 of FIG. 15. Each of these tables that make up home selling table 50 are discussed below.

Referring now to home selling initiation selection point 122 of FIG. 9, relocation coordinator 84 exchanges information with transferee 82 and then selects home selling initiation selection point 122 for viewing and updating with the information received from transferee 82. This information includes such things as the property description of the transferee's home that is being sold, the location of the property, and the status of the home. Relocation coordinator 84 may select an update home selling initiation table 126, through home selling initiation selection point 122, with this information while also viewing such information as the transferee's address information from corporate system 32, the transferee's name from transferee information table 124, and the authorized benefits from authorized benefits table 106.

Referring now to listing information selection point 128 of FIG. 10 relocation coordinator 84, using relocation tracking system 38, accesses listing information selection point 128 and provides listing information to listing table 138 and updates broker table 132 by assigning a listing real estate broker/agent to the relocation. The information provided to listing table 138 includes such information as the original list price and information concerning the listing agreement with the listing real estate broker/agent. Once entered, the listing information may be viewed at anytime.

Relocation coordinator 84 may also view information from various other tables such as name information from transferee information table 124, closing information from noninventory table 130 and inventory table 134, and broker information from broker tracking table 136. Relocation coordinator 84 uses this information to assign a listing real estate broker/agent to a relocation. Once assigned, relocation tracking program 38 updates broker table 132 by generating a record reflecting the assignment of the real estate broker/agent assignment to the relocation.

Referring now to lien selection point 140 of FIG. 11, relocation coordinator 84 exchanges information with transferee 82 and selects or accesses lien selection point 140 for viewing and updating. Lien selection point 140 receives lien information from relocation coordinator 84 and lien table 142 and receives transferee information, such as the transferee's employee identification number, from transferee information table 124. Relocation coordinator 84 may then uses lien selection point 140 to update or provide information to lien table 142. For example, lien table 142 may include information concerning the transferee's lien or mortgage such as the loan number, payment frequency, due date, last payment date, grace period, late charge amount, interest rate, original balance, current balance, payment amount, and mortgage company address may be provided to lien table 142.

Referring now to title company selection point 144 of FIG. 12, relocation coordinator 84 exchanges information with transferee 82 and then selects or accesses title company selection point 144 for viewing and updating. Title company selection point 144 may receive information from relocation coordinator 84 that is then stored in title company table 148. The information may include the date that closing documents were ordered from the title company, the date that closing documents were sent to transferee 82, and the closing date. Title company selection point 144 also receives closing date information such as the closing date from inventory table 134 and noninventory table 130, the transferee's name from transferee information table 124, and title company information from title company table 148. Initially, relocation coordinator 84 views this information and assigns a title company to a relocation which updates title company table 148 by generating a new record assigning a title company to a particular relocation.

Referring next to mortgage/equity/proceeds selection point 150 of FIG. 13, relocation coordinator 84 exchanges information with transferee 82 and selects mortgage/equity/proceeds selection point 150 for viewing and updating. Relocation coordinator 84 uses mortgage/equity/proceeds selection point 150 to enter, update, and view mortgage, equity, and proceeds information to mortgage/equity/proceeds table 154. Mortgage/equity/proceeds selection point 150 receives transferee name information from transferee information table 124, and employee equity proceeds and advance information from mortgage/equity/proceeds table 154. Mortgage/equity/proceeds selection point 150 allows relocation coordinator 84 to view and edit mortgage, equity, and proceeds information for a particular relocation.

FIG. 14 includes inventory selection point 156, offer out selection point 158, and noninventory selection point 160.

Inventory selection point 156 receives inventory information from inventory table 134, offer/appeal date and acceptance date information from offer out table 152, and transferee's name information from transferee information table 124. Inventory selection point 156 allows relocation coordinator 84 to view this information and to update inventory table 134 with new inventory information. Such updated information includes contract information, estimated resale price, and actual resale contract information.

Referring to offer out selection point 158, information is provided to this selection point from relocation coordinator 84 and a variety of other tables. Offer out selection point 158 receives information surrounding outstanding offers from offer out table 152, transferee name information from transferee information table 124, and appraiser information from appraiser table 162. Relocation coordinator 84 may select and view all of this information and may provide updated information to offer out table 152 that reflects the status and necessary offer information. Offer out selection point 158 is used when a company makes an offer to purchase a transferee's home.

Focusing now on noninventory selection point 160, information, relocation coordinator 84 selects noninventory selection point 160 for viewing and updating. Relocation coordinator 84 provides information, via noninventory selection point 160, to update noninventory table 130. Additionally, noninventory selection point 160 also provides information to payroll application 28 and relocation/payroll earning trigger file 164 that reflects any seller incentives that transferee may be entitled to for home selling. Noninventory selection point 160 receives information from a variety of tables such as transferee information table 124, appraiser table 162, and noninventory table 130. The information provided from these tables includes such information as the transferee's name, the offer and appeal offer, and noninventory information. Relocation coordinator 84 uses noninventory selection point 160 to view this information and to update noninventory table 130. Noninventory selection point 160 is used when a company does not purchase a transferee's home, but instead, offers transferee 82 an incentive to sell the home without the company's assistance.

FIG. 15 provides appraisal information selection point 166 and BMA information selection point 168 so that relocation coordinator 84 may view and update appraisal information from appraisal table 162, and broker market analysis information from broker table 132. Transferee information table 124 provides general transferee information, such as the transferee's name, to both appraisal information selection point 166 and BMA information summary selection point 168.

Referring now in more detail to appraisal information selection point 166, relocation coordinator 84 may assign an appraiser to a particular relocation and may later view and update information on the appraisal. Appraisal table 162 is updated as a result of relocation coordinator 84 assigning an appraiser and providing appraisal information through appraisal information selection point 166. When an appraiser is assigned to a relocation, relocation tracking program 38 generates a new record in appraisal table 162 reflecting the assigned appraiser to the relocation.

Referring now to BMA information selection point 168, relocation coordinator 84 may assign a broker to a particular relocation and update broker table 132 with this assignment and pertinent broker market analysis information. Relocation tracking program 38 processes appraisal information and broker market analysis information to generate a spread which may be viewed by relocation coordinator 84. The spread includes an average appraisal amount and an average percentage spread between the appraisal amounts. The spread also includes a display of the broker market analysis information.

Thus, home buying table 52 may include one table or a variety of tables, as illustrated by FIGS. 9, 10, 11, 12, 13, 14, and 15. As illustrated, the various tables of home buying table 52 are updated with information throughout a relocation and generate new records in response. Also, relocation tracking program 38 has been demonstrated to provide additional processing by generating various values based on the information provided from the tables of home selling table 52.

Figure 16:
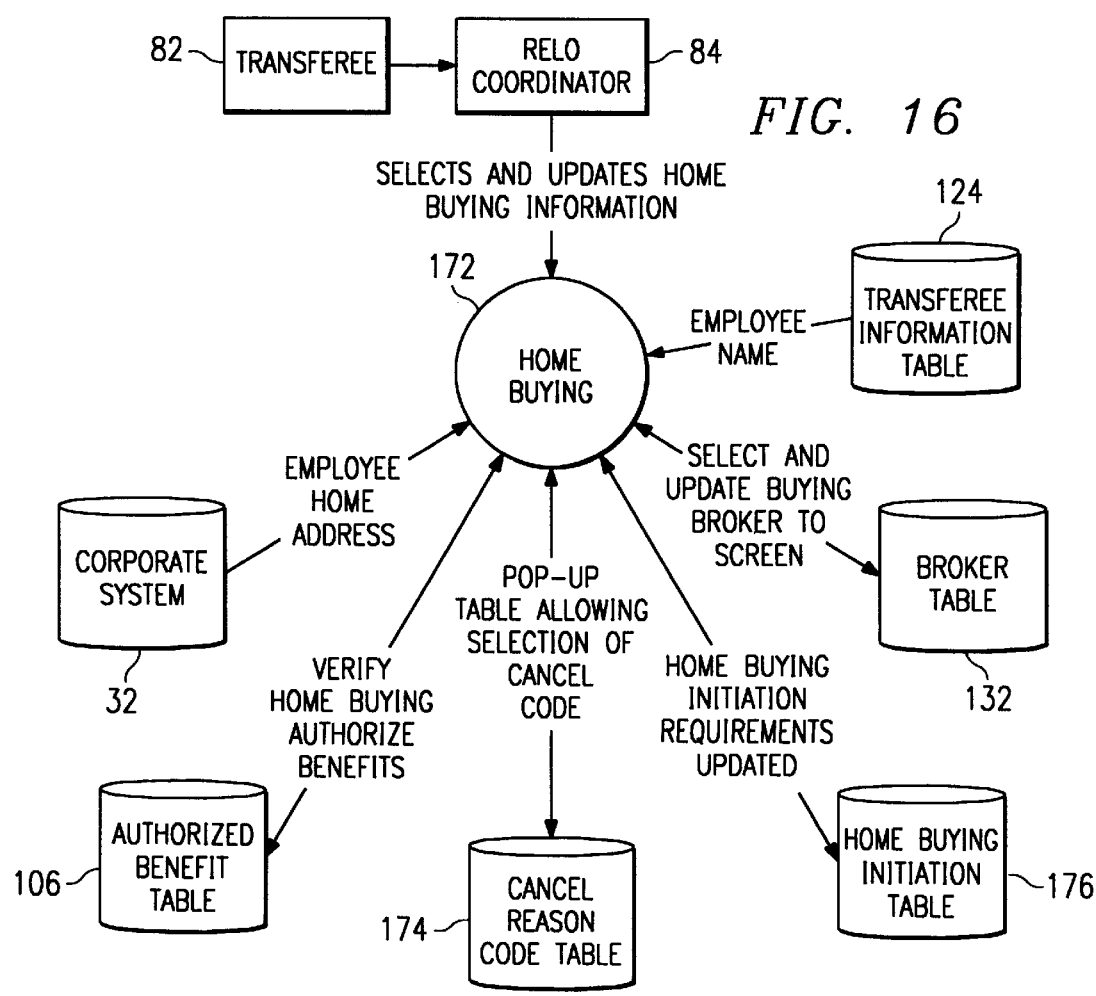
FIG. 16 is an information flow diagram illustrating the selection and update of a home buying table.

FIG. 16 is an information flow diagram illustrating the selection, update, and processing of home buying table 52 of relocation database 22 by relocation tracking program 38. The information of home buying table 52 may be selected and updated by using home buying selection point 172. Home buying selection point 172 may be implemented in relocation tracking program 38 as a menu that may be accessed by relocation coordinator 84. Home buying table 52 may include one table or multiple tables for storing home buying related information. FIG. 16 illustrates an implementation of home buying table 52 that includes a cancel reason code table 174, and a home buying initiation table 176.

Referring now to home buying selection point 172, transferee 82 provides information to relocation coordinator 84 who selects and updates home buying information and stores the information in home buying initiation table 146. Home buying initiation table 176 may include such information as the city and county where the transferee is moving, the date that home buying authorized benefits were canceled, the reason why home buying benefits were canceled, the purchase price of the home, and the address of the purchased home. Relocation coordinator 84 may view various other types of information through home buying selection point 172 such as employee home address information originally provided from corporate system 32, authorized home buying benefits information from authorized benefits table 106, and transferee information from transferee information table 124. Furthermore, relocation coordinator 84 may cancel home buying benefits by updating cancel reason on home buying initiation table 176 by selecting a cancel reason code from cancel reason code table 174. Relocation coordinator 84 may also access and update broker table 132 and assign a home buying real estate broker/agent to a particular relocation to assist transferee 82.

Thus, home buying table 52 may include one table or multiple tables such as home buying initiation table 176 and cancel reason code table 174. Home buying table 52 is updated with a new record after a relocation request is received indicating that home buying benefits are authorized for a relocation.

Figure 17:
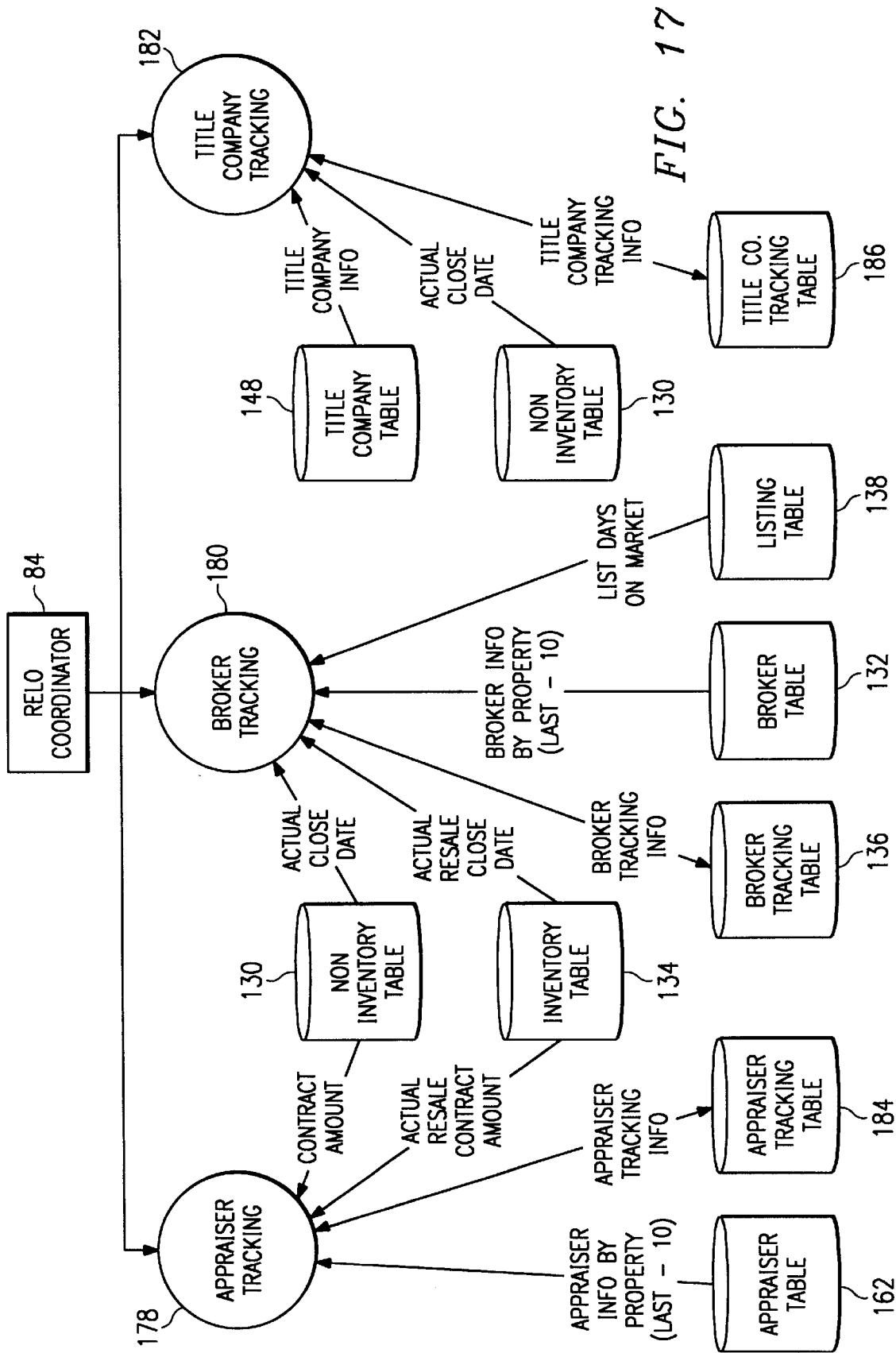
FIG. 17 is an information flow diagram illustrating the selection and update of a tracking table of appraiser, broker, and title company tracking information.

FIG. 17 is an information flow diagram illustrating the selection, update, and processing of tracking table 54 of relocation database 22 by relocation tracking program 38. The information contained in tracking table 54 may be viewed and updated by selecting either an appraiser tracking selection point 178, a broker tracking selection point 180, or a title company tracking selection point 182. These selection points may be implemented as menus in relocation tracking program 38. Tracking table 54 may be implemented as one table or as multiple tables and may include all or some of the information associated with the selection points just mentioned. FIG. 17 illustrates an implementation of tracking table 54 that includes an appraiser tracking table 184, a broker tracking table 136, and a title company tracking table 186.

Referring now to appraiser tracking selection point 178 of FIG. 17, relocation coordinator 84 selects or accesses appraiser tracking selection point 178 for viewing and updating appraiser tracking table 184. This information may be used by relocation coordinator 84 to assign an appraiser to a particular relocation. Appraiser tracking selection point 178 allows relocation coordinator 84 to view and update appraiser tracking table 184 with information concerning an appraiser. For example, the appraiser's mailing address, phone number, current status, and history may be viewed and updated. Additional information may also be generated and viewed through appraiser tracking selection point 178 such as appraisal information for the last 10 appraisals and corresponding actual sells or contract prices. This source information is provided from appraiser table 162, noninventory table 130, and inventory table 134.

Relocation tracking program 38 generates appraiser rating information from the information provided from appraiser table 162, noninventory table 130, and inventory table 134. For example, through appraiser tracking selection point 178, relocation coordinator 84 may view appraiser rating information that indicates historical appraised values versus actual sell values. This may be generated for the last ten appraisals of the appraiser. Relocation tracking program 38 may express these values as percentages and may provide an average percentage for a combination of appraisals.

Referring now to broker tracking selection point 180, information is provided to this selection point from noninventory table 130, inventory table 134, broker table 132, listing table 138, and broker tracking table 136 so that relocation coordinator 84 may evaluate brokers. Relocation coordinator 84 may also view and update general broker information to broker tracking table 136 through broker tracking selection point 180. The general broker information may include such information, for example, as the broker's mailing address, phone number, current status, and history. Relocation coordinator 84 may view information about a particular broker's prior transactions from these tables to assist in selecting a particular broker. For example, the actual closing or sell date, historical sells data for the past ten transactions handled by the broker, and the number of days a home stayed on the market when this broker was a selling broker.

Relocation tracking program 38 generates a broker rating based on this information. For example, rating information may include percentage comparisons between the actual sales price of homes handled by a broker and a broker's estimated sales price. Average percentages may also be generated by relocation tracking program 38 and may be viewed through broker tracking selection point 180.

Referring next to title company tracking selection point 182, relocation coordinator 84 selects or accesses title company tracking selection point 182 for viewing or updating. Relocation coordinator 84 provides general title company information, such as name, address, etc., through title company tracking selection point 182 for storage in title company tracking table 186. Title company tracking selection point 182 also receives title company general information from title company table 148, actual historical closing date information from noninventory table 130, and title company tracking information from title company tracking table 186. Relocation coordinator 84 analyzes the provided information and uses this information to select a title company to assist with a relocation.

Thus, tracking table 54 may be implemented to include a variety of tables such as appraiser tracking table 184, broker tracking table 136, and title company tracking table 186. However, tracking table 54 may be implemented using only one table.

Figure 18:
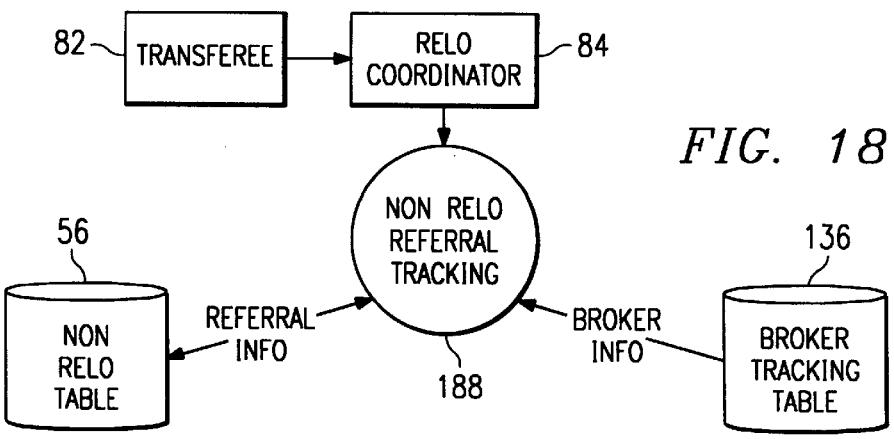
FIG. 18 is an information flow diagram illustrating the selection and update of a non-relocation table.

FIG. 18 is an information flow diagram illustrating the selection, update, and processing of non-relocation table 56 of relocation database 22 by relocation tracking program 38. A non-relocation refers to the use of relocation tracking system 10 for providing real estate broker/agent referral information outside of an employee relocation. Once a referral to a real estate broker/agent is made, the referred broker/agent provides a referral fee if a sale is later made.

The information of non-relocation table 56 may be viewed and updated by selecting non-relocation referral tracking selection point 188 from relocation tracking program 38. Non-relocation referral tracking selection point 188 may be implemented as a menu in relocation tracking program 38. Relocation coordinator 84 selects non-relocation referral tracking selection point 188 and views and updates broker information from broker tracking table 136 and non-relocation table 56. Once an appropriate broker is chosen, relocation coordinator 84, using non-relocation referral tracking selection point 188, may enter information concerning the referral such as the party being referred and their address. In response, relocation tracking program 38 generates a record in non-relocation table 56.

Figure 19:
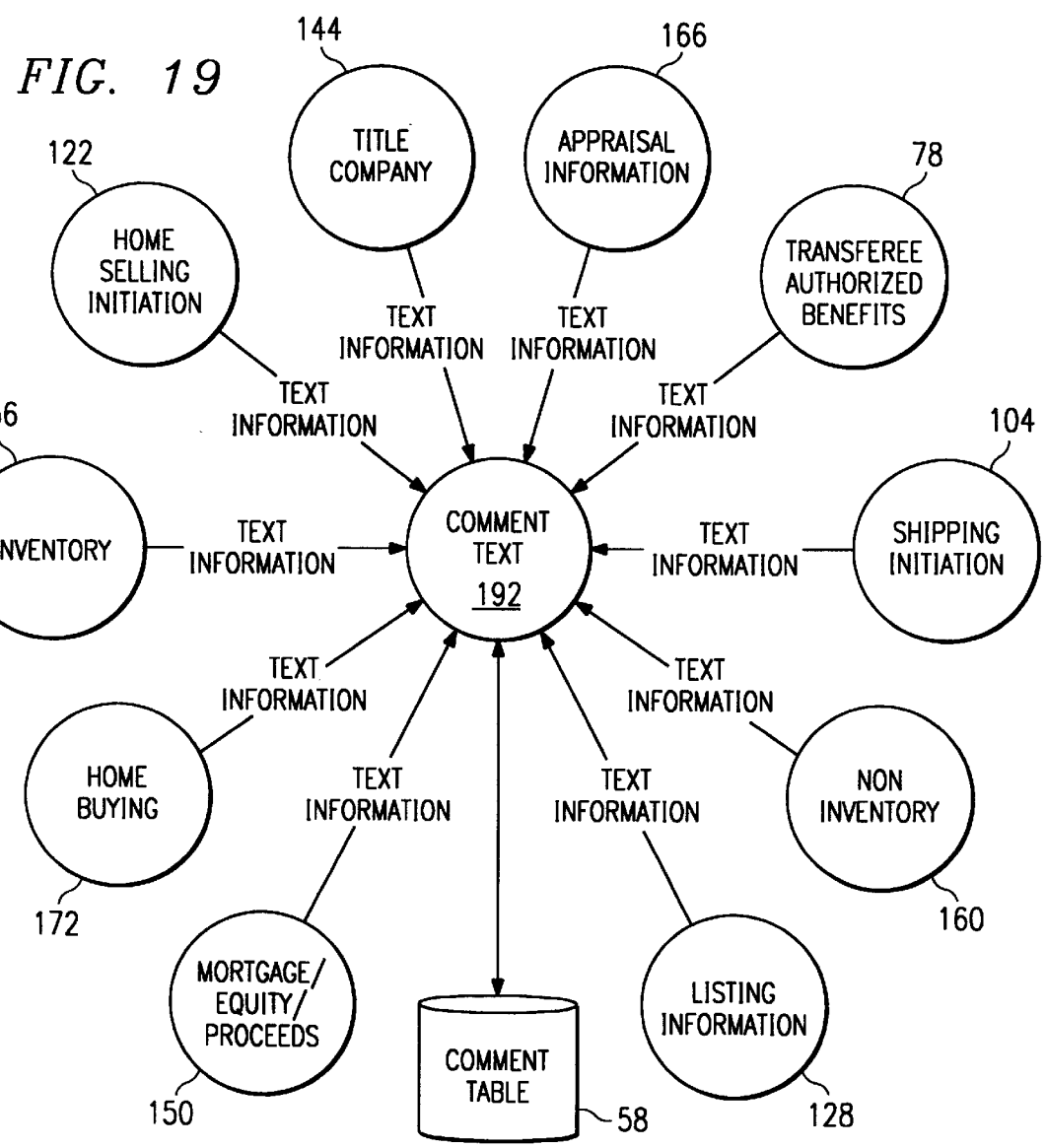
FIG. 19 is an information flow diagram illustrating the selection and update of a comment table.

FIG. 19 is an information flow diagram illustrating how information may be provided throughout relocation tracking program 38 to comment table 58. Relocation tracking program 38, at virtually every selection point mentioned above, allows relocation coordinator 84 to generate text information that will ultimately be stored in a record of comment table 58. The comment or text information may be viewed and updated by selecting comment/text selection point 192 from various points throughout relocation tracking program 38. For example, relocation coordinator 84 may provide information to comment table 58 from the following selection points: Mortgage/equity/proceeds selection point 150, home buying selection point 172, inventory selection point 156, home selling initiation selection point 122, title company selection point 144, appraisal information selection point 166, transferee authorized benefits selection point 78, shipping initiation selection point 104, noninventory selection point 160, and listing information selection point 128. Depending on which selection point relocation coordinator 84 uses to provide text information to comment table 58, relocation tracking program 38 generates a text type identifier indicating where relocation coordinator 84 accessed comment/text selection point 192. In addition, the date and a relocation coordinator identifier is also saved with the entered text. As a result, when reviewing comment table 58, information is provided that indicates the date the text was entered, the relocation coordinator, and a text type identifier which should indicate the nature of the text.

Thus, it is apparent that there has been provided, in accordance with the present invention a relocation tracking system and method for tracking a relocation that satisfies the advantages set forth above. Although the preferred embodiment has been described in detail, it should be understood that various changes, substitutions, and alterations can be made herein. For example, a variety of different computers and computer languages could be used to implement the present invention. Also, the implementation of relocation database 22 could be altered by one skilled in the art such that one table is separated into multiple tables or such that multiple tables are combined into one table while still achieving the desired results demonstrated by the present invention. Other examples of changes, substitutions, and alterations are readily ascertainable by one skilled in the art and could be made without departing from the spirit and scope of the present invention. While the invention has been particularly shown and described by the foregoing detailed description, it will be understood by those skilled in the art that various other changes in form and detail may be made without departing from the spirit and scope of the invention as defined by the following claims.

What is claimed is:

1. A relocation tracking system comprising:
    mass storage device operable to store a relocation database having:
        a transferee table
        a shipping table providing for commercial and self-move relocations;
        a home selling table
        a home buying table; and,
        a tracking table for tracking home buying/home selling participants in addition to the transferee; and,
    a processor operable to process a relocation request indicating authorized benefits, the processor operable to access and update the transferee table, the shipping table, the home selling table, the home buying table, and the tracking table of the relocation database in response to processing the relocation request.

2. The relocation tracking system of claim 1, wherein the relocation database further includes a tracking table for tracking home buying/home selling participants, and the processor is operable to access and update the tracking table and to generate a non-relocation table, and the processor is operable to access and update the non-relocation table in response to receiving non-relocation input data rating information for tracking home buying/home selling participants.

3. The relocation tracking system of claim 1, wherein the processor is operable to generate and provide a relocation tax file from the transferee table.

4. The relocation tracking system of claim 1, wherein the relocation database further includes a home buying table, and the processor is operable to access and update the home buying table in response to processing the relocation request authorizing home buying benefits.

5. The relocation tracking system of claim 1, wherein the tracking table includes appraisal tracking information, and the processor is operable to generate appraiser rating information.

6. The relocation tracking system of claim 1, wherein the tracking table includes broker tracking information, and the processor is operable to generate broker rating information.

7. The relocation tracking system of claim 1, wherein the tracking table includes title company tracking information and the processor is operable to generate title company rating information.

8. The relocation tracking system of claim 1, wherein the relocation database further includes a non-relocation table, and the processor is operable to access and update the non-relocation table in response to receiving non-relocation input data.

9. The relocation tracking system of claim 1, wherein the relocation database further includes an expense table, and the processor is operable to access and update the expense table in response to receiving expense input data.

10. The relocation tracking system of claim 9 wherein the expense input data is provided from an accounting system.

11. The relocation tracking system of claim 1, wherein the relocation database further includes a comment table, and the processor is operable to access and update the comment table in response to receiving comment input data.

12. The relocation tracking system of claim 11, wherein the processor is operable to generate a text type identifier and to access and update the comment table in response.

13. The relocation tracking system of claim 1 further comprising a graphical user interface providing interactive access to the relocation database.

14. A relocation tracking system comprising:
    a mass storage device operable to store a relocation database having:
        a transferee table;
        a shipping table providing for both commercial and self-move relocations;
        a home selling table;
        a home buying table; and
        a tracking table for tracking home buying/home selling participants in addition to the transferee; and,
    a processor operable to process a relocation request indicating authorized benefits, the processor operable to generate a record in the home selling table, the home buying table, the tracking table, the transferee table and the shipping table of the relocation database in response to processing the relocation request.

15. The relocation tracking system of claim 14, wherein the relocation database further includes a tracking table for tracking home buying/home selling participants, and the processor is operable to generate a record in the tracking table and to generate rating information for tracking home buying/home selling participants.

16. The relocation tracking system of claim 14, wherein the tracking table includes appraiser information and the processor is operable to generate a spread rating.

17. The relocation tracking system of claim 14, wherein the tracking table includes real estate broker/agent information and the processor is operable to generate a rating associated with the broker/agent information.

18. The relocation tracking system of claim 17, wherein the processor is operable to generate a record in the relocation database when a real estate broker/agent is selected from the tracking table associating a real estate broker/agent with a relocation.

19. The relocation tracking system of claim 14, wherein the relocation database further includes a non-relocation table, and the processor is operable to generate a record in the non-relocation table in response to receiving non-relocation input data.

20. The relocation system of claim 19, wherein the processor is operable to generate a referral fee and update the non-relocation table in response.

21. The relocation tracking system of claim 14, wherein the relocation database further includes an expense table, and the processor is operable to generate a record in the expense table in response to receiving expense input data.

22. The relocation tracking system of claim 21, wherein the processor is operable to generate expense summary information and update the expense table in response.

23. The relocation tracking system of claim 14, wherein the relocation database further includes a comment table, and the processor is operable to generate a record in the comment table in response to receiving comment input data.

24. The relocation tracking system of claim 23, wherein the processor is operable to generate a text type identifier and update the comment table in response.

25. The relocation tracking system of claim 14, further comprising a database management system operable to update the relocation database in response to receiving commands, the processor operable to generate commands for updating the relocation database.

26. The relocation tracking system of claim 14, wherein the processor is operable to generate a mail merge file.

27. A computer implemented method for automatically tracking a relocation comprising the steps of:
   receiving a relocation request;
   receiving transferee information;
   receiving authorized benefits for a relocation;
   generating a record in a transferee table in response to receiving a relocation request;
   generating a record in a home selling table if home selling benefits are authorized
   generating a record in a home buying table if home buying benefits are authorized;
   generating a record in a tracing table in response to receiving tracking information about home buying/ home selling participants in addition to the transferee; and
   generating a record in a shipping table providing for commercial and self-move relocations in response to receiving a relocation request.

28. The method of claim 27, wherein the transferee table and the shipping table comprise a relocation table.

29. The method of claim 27, further comprising the steps of receiving expense information and generating a record in an expense table in response.

30. The method of claim 27, further comprising the steps of:
   receiving tracking information about home buying/home selling participants;
   generating a rating for home buying/home selling participants; and
   generating a record in a tracking table in response to receiving tracking information.

31. The method of claim 30 wherein the tracking information includes real estate broker/agent information.

32. The method of claim 30 wherein the tracking information includes appraisal information.

33. The method of claim 27, further comprising the steps of:
   receiving non-relocation information;
   generating a referral fee in response to receiving non-relocation information; and
   generating a record in a non-relocation table in response to receiving non-relocation information.

* * * * *